(12) United States Patent
Merati

(10) Patent No.: US 10,846,984 B2
(45) Date of Patent: Nov. 24, 2020

(54) CASINO CRYPTO CURRENCY SYSTEMS AND METHODS

(71) Applicant: UPLAY1, San Diego, CA (US)

(72) Inventor: Bruce Merati, San Diego, CA (US)

(73) Assignee: Uplay1, Las Vegas, NV (US)

( * ) Notice: Subject to any disclaimer, the term of this patent is extended or adjusted under 35 U.S.C. 154(b) by 0 days.

(21) Appl. No.: 16/278,820

(22) Filed: Feb. 19, 2019

(65) Prior Publication Data

US 2019/0180558 A1 Jun. 13, 2019

Related U.S. Application Data

(63) Continuation-in-part of application No. 15/436,600, filed on Feb. 17, 2017, now Pat. No. 10,210,703.

(60) Provisional application No. 62/726,317, filed on Sep. 3, 2018, provisional application No. 62/299,299, filed on Feb. 24, 2016.

(51) Int. Cl.
| | |
|---|---|
| *G07F 17/32* | (2006.01) |
| *G06Q 20/38* | (2012.01) |
| *G06Q 20/36* | (2012.01) |
| *H04L 9/06* | (2006.01) |
| *H04L 9/32* | (2006.01) |

(52) U.S. Cl.
CPC ..... *G07F 17/3241* (2013.01); *G06Q 20/3678* (2013.01); *G06Q 20/3829* (2013.01); *G07F 17/3223* (2013.01); *G07F 17/3244* (2013.01); *H04L 9/0637* (2013.01); *H04L 9/0643* (2013.01); *H04L 9/3239* (2013.01); *H04L 2209/38* (2013.01); *H04L 2209/56* (2013.01)

(58) Field of Classification Search
None
See application file for complete search history.

(56) References Cited

U.S. PATENT DOCUMENTS

| | | | |
|---|---|---|---|
| 10,540,654 B1* | 1/2020 | James | G06Q 20/3829 |
| 2018/0336553 A1* | 11/2018 | Brudnicki | G06Q 20/3829 |
| 2019/0102758 A1* | 4/2019 | Wright | G06Q 20/382 |
| 2019/0130391 A1* | 5/2019 | Wright | G06F 21/30 |
| 2019/0180558 A1* | 6/2019 | Merati | G07F 17/3223 |
| 2019/0236594 A1* | 8/2019 | Ehrlich-Quinn | G06Q 20/065 |

* cited by examiner

*Primary Examiner* — Ronald Laneau
(74) *Attorney, Agent, or Firm* — Thibault Patent Group

(57) ABSTRACT

An inter-gaming operator (IGO) server and method is described. The IGO server receives gaming and non-gaming transactions from gaming operator systems, comprising gaming platforms and merchants associated with each gaming operator system. Each gaming operator system issues its own casino crypto currency (C3) for use in gaming and non-gaming transactions. For each transaction that is processed by the IGO, the IGO debits and credits user accounts in accordance with the particular C3 involved in each transaction. Each transaction is further maintained by generating one or more crypto-blocks, each crypto-block comprising a cryptographically-encoded version of all or a portion of the information in each transaction received by the IGO server. Because the IGO server is coupled to multiple gaming operator systems, the IGO server may be used to detect illicit wagering activities that heretofore could not be detected.

18 Claims, 17 Drawing Sheets

| Database | Permission Rights | | | |
| --- | --- | --- | --- | --- |
| | Player | Operator | Regulator | Merchant |
| User Profile | Y | Y | Y | Y |
| Deposits & Withdrawals | Y | Y | Y | N |
| C3 Balance | Y | Y | Y | Y |
| Gaming | Y | Y | Y | N |
| Wagering | Y | Y | Y | N |
| Non-Gaming | Y | Y | Y | Y |
| Loyalty Rewards | Y | Y | Y | Y |

CASINO CRYPTO CURRENCY SYSTEMS AND METHODS

CLAIM OF PRIORITY

This application is a continuation-in-part of U.S. application Ser. No. 15/436,600 filed on Feb. 17, 2017, which claimed the benefit of U.S. provisional patent application No. 62/299,299, filed on Feb. 24, 2016. Also, this application claims the benefit of U.S. provisional patent application No. 62/726,317, filed on Sep. 3, 2018 and incorporated by reference herein.

BACKGROUND

Field of Use

The present application relates to gaming systems and more specifically to the casino industry and gaming systems.

Description of the Related Art

Sports wagering is a growing industry throughout the world and, in most jurisdictions, is subject to strict laws. In the case of the United States, both state and federal law govern all aspects of gambling and wagering activities. In the last twenty years, placing wagers on the outcome of sporting activities has been on a steady rise in both the U.S. and other parts of the world. Most European countries historically have been more liberal towards wagering and have allowed bookmakers legally to take wagers on the outcome of almost any future event such as a sports match, a presidential election, a winner of a movie award or other scenarios where there is more than one possible outcome, or the outcome is less than certain.

In the United States, Nevada is currently the only state that allows a full range of sports wagering. Delaware is another state that has recently allowed most, but not all types of wagering. Delaware currently does not allow straight wagers, commonly called a head-to-head wager, where the outcome is based on a single game. Oregon and Montana also have some Federal exemptions and allow small stake sports wagering.

Recently, Nevada regulators have allowed licensed bookmakers to also take bets on nonsporting events. With sports wagering outlawed in other states, sport enthusiasts in the U.S. have no option but to place wagers through illegal bookmakers (bookies) or offshore websites. Illegal bookmaking from U.S. residents has been a growing and thriving business for illicit operators. The American Gaming Association estimates U.S. citizens illegally wagered $149 billion on sports in 2015 through offshore betting websites and illegal bookmakers.

With the growth and popularity of the Internet, boosted by mobile devices and wireless broadband, as well as expansion of video streaming, betting on offshore sports wagering sites has been growing rapidly, forcing the U.S. Department of Justice and the state officials to enact new laws to combat illegal wagering. Enforcement of these laws, however, has proven to be a very difficult task and, every time the U.S. government has passed a new law, offshore operators have introduced a new strategy that has made the law enforcement difficult. Historically, most types of gaming in the U.S. have been conducted through land-based venues owned and managed by licensed gaming establishments who initially opposed online gaming. Some land-based casinos have reversed their positions and led the charge in 2013 that resulted in legalization of online gaming in Nevada, Delaware and New Jersey. The U.S. laws treat wagering, gaming and lotteries very differently, even though they are all a form of gambling. Despite the legalization of Internet gaming by the state of New Jersey, the Federal laws prevail over the state's online gaming laws, making sports wagering illegal in the state even though almost any type of gaming is legal online within the state.

The Interstate Wire Act of 1961 prohibits the operation of certain types of betting operations in the United States. The Wire Act together with other federal bookmaking statutes was intended to assist the states and other jurisdictions in the U.S. to enforce their respective laws on gambling and bookmaking. For the past three years, the state of New Jersey has been trying to legalize sports betting to give a boost to Atlantic City's casinos and the state's horseracing industry, both of which have been struggling financially. As of now, New Jersey's efforts to legalize sports wagering has hit resistance from both the courts and certain sports leagues, such as the NFL.

Lately, wagering on daily fantasy sports has proven to be a thriving business, attracting the attention of regulators at both the federal and state levels. Daily fantasy sports ("DFS") are a version of traditional fantasy sports that are conducted over a short period of time, such as a week or on a single day of competition, as opposed to the traditional fantasy sports, which are played across an entire season. The popularity of DFS has shown that sport enthusiasts are much more interested in a short contest, which is more like a traditional sports wagering than a contest spanning over a long period such as a season.

The premise behind fantasy sports is for game participants to pay an entry fee to enter into a contest and put together the best virtual or fantasy team of players that achieves the highest fantasy points, with each player being assigned a certain amount of salary. The combined salaries of all the team must stay under a certain cap. There are some who argue such a contest is a skill-based game, thus exempting such games from U.S. wagering laws, and there are those who argue differently. Some of the major networks, sporting team owners and professional leagues have recently invested hundreds of millions of dollars in FanDuel and DraftKings, two of the biggest DFS companies who started heavily advertising on TV and other media, until the attorney general of some states such as Nevada and New York accused DFS as being unlawful, unless they were licensed or regulated by their states. The recent popularity of DFS has proven that sports fans in the U.S. are looking to express their opinions about sports wagering and how players will perform in a game or a series of games.

In Europe, live wagering during a game, sometimes called In-game, In-wagering or InPlay, has been growing exponentially. InPlay wagers are placed on an event, match, or race while the event is still in progress. A bookmaker often tasks a bet trader to watch a game live and create time sensitive InPlay wagering odds during the game. InPlay wagers fulfill the urge for interactivity and instant gratification, an entertainment experience that appeals to the phycology of most millennials who have grown up playing interactive video games and now represents a large percentage of the population legally allowed to wager on sporting events. The goal of the trader is to offer InPlay odds that appeal to a wide range of viewers, get them engaged to feel they are part of the game, split their opinions through odds offered and to entice bets on both sides of the proposition. If an odds maker's book gets out of balance, it immediately tries to balance its books by offering new odds in an attempt to bring more bets on the other side to minimize its exposure to the outcome of the event.

Live odds are offered in real time before the event finishes. For example, in tennis, punters can bet on total games played in a set, a set's score. In soccer or football, they can bet on the half time results or on the next team to score. Availability of smart phones has made InPlay wagering extremely convenient for viewers to watch a sport live and place wagers while the game is in progress in a new phenomenon that is called second-screen wagering. Globalization, new social media, ubiquity of the Internet, smart phones, computer tablets and availability of live sports on TV and HD video streaming, has made sports wagering increasingly more popular with sport enthusiast around the globe who would like to root for their favorite teams and athletes by placing wagers before and during the game.

In Europe, InPlay wagering is increasing becoming a bigger percentage of the total wagering handles of a bookmaker, proving that people prefer to place a wager while the game is in progress. Also, social media sites have started competing with each other by entering into the excitement of watching sports. By adding new features to their sites, they make watching live games more social. For example, Facebook is rolling out a new live feed, called Sports Stadium, that gives people another way to follow sporting events and chat about them as they happen. The feed combines what people already check Twitter and ESPN for during the games and shifts that second-screen experience from those properties to Facebook. The more people are engaged in watching a live sport, the more opportunity exists for InPlay wagers.

In Europe and other parts of the world, betting exchanges are also becoming increasingly more popular, with punters wagering against each other rather than placing a wager with a bookmaker, who for facilitating the wager, takes a fee commonly called juice or vig, short for vigorish. To compete with betting exchanges, some traditional bookmakers in Europe have been forced to reduce their fees. The competition between bookmakers as the middlemen and the Internet betting exchanges, that effectively eliminates the middlemen, has created lower fees but higher handles in jurisdictions that do not treat sports wagering as an illegal activity. In highly regulated jurisdictions such as the state of Nevada, due to strict regulations, operators have been slow in taking advantage of new technologies, and the competition and pressure of wagering fees has not been as fierce as in Europe.

Another new phenomenon in wagering is betting on a stock or a financial market.

These wagers are usually based on a value associated with a financial market, giving punters the opportunity to bet on whether a financial market or a stock value will be above or below a moving line at a designated time. The wager is then settled after the designated time to resolve whether the user is entitled to a credit or a debit. Some jurisdictions are taking the position that an operator taking wagers on stocks and financial instruments needs to have a securities license and some jurisdictions consider such activities purely as a wagering activity.

Politics, tax revenues, consumer protection and game integrity are some of the reasons behind various interest groups arguing as to whether a state should legalize sports wagering. As an example, the NFL is opposed to sports wagering, arguing that it may incentivize players and referees to fix game outcomes. This position, however, is flawed, and is in contrast with the NFL's push to have more and more of its games played in London, where wagering is legal and very common. Also, another contradictory factor is that the volume of wagers that illegal offshore web sites are currently taking on U.S. games such as football are much larger than Nevada's handles. Moreover, the chances of unregulated offshore operators fixing a game are higher than operators who are regulated and licensed by a state.

Wagering is already a multi-billion-dollar industry in most European, Asian and

North American countries and has the potential to be an even bigger business. By offering odds that appeal to both sides of a wager, a bookmaker's goal is to split people's opinion in half to balance its books or minimize its exposure to the outcome of the event. In exchange for facilitating the process, a bookmaker collects a fee from the winning side, which is typically about 5% percent of total amount wagered in a pre-match wager and 10% on an InPlay wager. Typically, the bookmaking business starts with one or more leading odds makers setting up the initial lines using detailed data, statistics and historical information about the players and the teams. Once a leading book adopts the odds, other books then start offering them as the basis for their starting lines. Odds offered before a game are called pre-match lines, which often change based on the volume of wagers placed on each side of the wager. Illegal bookies that do not have liquidity often lay off their pre-match exposures by placing wagers with Nevada books or international betting exchanges.

Nevada operators also offer long shot odds such as whether the first score of a football game will be a safety, or whether a quarterback will throw a touchdown or interception on the next play, etc. These types of wagers are called proposition bets or "prop bets" and have high risk and rewards for a bookmaker. The goal of an experienced bookmaker, by offering prop bets, is to tantalize bettors with promises of big payoffs. Unlike point spreads and money lines, prop bets can vary wildly from sports book to sports book. To overcome the volatility inherent with prop bets, bookmakers often offer hundreds of prop bets to average out the risk and rewards associated with these types of risky wagers. For popular games such as football, basketball and baseball, an average fan may bet on four or five prop bets along with only one traditional point spread.

Sometimes, professional handicappers, called "wise guys", who make a living from betting against a sports book cause a book to change its lines. There are also those who arbitrage by placing wagers with different books when they see the lines from different operators. This provides an opportunity to make a profit with little or no risk. Online betting and availability of data has helped experienced arbitragers to increase their chances of making a profit from the inefficiencies of a sports wagering market. Once a game starts, pre-match odds are no longer offered, and bookmakers encourage punters to bet on InPlay wagers.

Currently, sport enthusiasts in the U.S. are prohibited or are limited to the type of wagers they can place. A U. S. resident must either bet with a sports book in a state such as Nevada or bet with local illegal bookies or on offshore websites. Most of what is currently offered in Nevada and Delaware are pre-match odds with very little InPlay odds offered by Nevada sports books. Typically, Nevada books only offer pre-match odds for popular U.S. games such as football, basketball, baseball and hockey. Regulations and licensing have kept Nevada books isolated from the international wagering market. Also, due to lack of adequate player participation within the state, most often Nevada books do not offer a comprehensive set of odds on non-U.S.

games even if they are worldwide events, such as the Olympics, the World Cup and the Grand Slam Tennis.

Historically, sports wagering in Nevada has been a B2C business model with the wagering license being attached to a casino's property. Smaller casinos often lease a space inside their casinos to a licensed operator to run the sports book on their behalf. The main reason for the lack of technology interaction and connectivity between Nevada operators has been lack of open competition from outside of the state. The high upfront cost of investigation for an outside entity to get licensed as a sports book operator within the state, in comparison to the potential business opportunities that the state currently offers, has prevented most international sports books from entering into the Nevada market. Nevada operators have traditionally been risk averse—after they set up initial lines, they often move the lines to avoid financial risks associated with the outcome of the event. Traditionally the term "book" refers to any system, computerized or manual, that tracks wagers and payouts of a wager broker. A book may refer to a single wagering event, such as a particular sporting event or globally to all wagering events offered by a wagering entity, such as a casino, online establishment, etc. Some Nevada casinos that are owned by a major gaming company run their own books, with smaller casinos often leasing their license to a sports wagering operator. Currently, Nevada casinos have not developed a cooperative market or an exchange for a more robust and efficient market for wagering activities.

In Nevada and Europe, wagering traditionally has been based on fixed odds. On a pre-match wager, a punter normally has to risk $11 to win $10. As an example, if an NFL team A is favored to win against team B by 10 points, books give the weaker team a handicap point or, alternatively, deduct the handicap point from the stronger team. In the above example, a book may display a −10 next to team A to show it is the favorite to win by 10 points against team B or may display a +10 next to team B to show it is underdog by 10 points. Assuming the book has a balanced book, i.e. for every $11 wagered on team A, exactly the same amount is also wagered on team B, then for every $22 wagered, the book will pay $21 to the winner which is the original $11 wager plus a $10 win, with the book keeping $1 as its fee. By dividing the $1 fee by the $22 total amount wagered, the theoretical house edge or commission for the house is calculated to be 4.545%.

Conventionally, only horse racing has been offered in a pari-mutuel format with the house having no risk to the outcome of a race. The main appeal of fixed odds to punters is that they know how much they can win when they place their wagers. However, for an operator, fixed odds wagering is oftentimes a very risky business. The major sports books in the U.S. and Europe are public companies, which by their nature of having public stockholders who expect results that are better than previous periods, have to avoid large risks. Currently, books, large or small, typically shy away from large bets if they do not have enough wager liquidity for the event. As online sports wagering is becoming a global business and punters can place wagers in any part of the world with a click of a button, there is a need to process large amounts of wagers and address the main obstacle inherent in the business, i.e. addressing risk when there is low liquidity of wagers.

Two sports wagering laws passed by Nevada legislators in 2015 will have a major impact on the state's traditional wagering business. One of the bills authorizes financiers to invest in a "wagering entity" registered by the state to take risks on sporting events, and the other bill allows Nevada books to operate in other regulated markets. The purpose behind these bills is to provide more liquidity and more sports betting opportunities between Nevada and other jurisdictions, especially by those who are operating in European countries. The new laws will expand Nevada's wagering activities beyond the state's current traditional wagering and will allow professional handicappers, i.e. those who analyze historical data to better predict the odds of an event, to manage the monies of investors taking risks on sports wagering. The investment made in these entities can take risks on fixed odds wagers that have guaranteed payouts, pari-mutuel wagering or other gaming formats that are currently used in the gaming industry.

Technology is quickly changing the gambling industry worldwide, and in highly regulated markets such as the U.S. where gambling and wagering is dominated by land-based casinos, players are demanding digital gaming experience similar to those offered in the rest of the world such as Europe. Unlike most other countries, only U.S. licensed casinos and gaming establishments such as card clubs and some state-run lotteries have the legal rights to take wagers on games of chance. In May 2018, following a supreme court ruling, some states started allowing casinos to take wagers on sports and other future events. Traditionally one of the challenges facing the regulated gaming industry has been money laundry and now, post the supreme court decision to allow any state to offer sports wagering, the risk of match fixing, and associated scandals has posed new challenges to the industry. Innovative technology solutions are described in below paragraphs, which provide wager history transparency to regulators and law enforcement agencies to deter bad actors to engage in money laundering schemes by hedging their own bets, wagering on both sides of an event and effectively guaranteeing to get paid as a legal payment by a licensed operator 95.5% of their illicit money. Before sports wagering became legal in states such as New Jersey, Nevada sportsbook managers collaborated by phone with each other when presented with suspicious wagers, however now that sports wagering is legal in many states, the industry is in need of technology solutions to overcome the difficulties in identifying money laundry and match fixing schemes by fraudsters involved in illicit activities.

The origin of the casino industry goes back to the early days of gambling houses offering traditional table games such as blackjack and roulette using the same type of chips as those used in today's casinos. They followed the same process practiced today, such as exchanging players' cash for chips, dropping cash into a locked box mounted at the game's table, etc. Over the years, casinos began extending credits to high rollers using paper slips called "markers", which essentially are promissory notes signed by players for borrowing money from casinos in exchange for receiving chips. Historically, a casino's daily revenue is calculated by adding the total "net wins" of all of its games including table games, slots and virtual games played online. Casino table gaming revenues are calculated on a table-by-table basis, for example the daily net win of a blackjack table is calculated by using a rudimentary formula based on the net change in the total chip inventory of the table between the opening and closing of a shift as adjusted for the shift's drops (cash dropped in a table's locked box), markers (casino credits) and fills (chips brought in from the cage). Casinos have yet to develop a comprehensive and accurate system that tracks the play history of a patron's activities across all their tables.

The next generation of casino games was mechanical slot machines. The first slots introduced were machines taking in coins as wagers and paying winners with coins falling into a tray at the bottom of the machine. Over the years, slot machines evolved into glitzy electronic gaming devices and instead of taking coins, slots now take dollar notes as well as casino vouchers called TITO (Ticket-In Ticket-Out). TITO is a slot currency used inside a casino, which are exchangeable to cash at designated kiosks inside a casino or at a casino's cage. The revenue i.e. "net win" of a slot machine is calculated by deducting the total dollar amount of the tickets issued by the machine from the total dollar amount of bills and TITO vouchers inserted into the machine. Currently, slot gaming revenues are calculated on a machine-by-machine basis and similar to table gaming, today's casinos have no readily available database that tracks the history of a player's activities across all their slot machines and table games on real-time basis.

About twenty-five years ago, casinos started rewarding players with loyalty points based on wagering activities. Casino loyalty points are typically redeemable at various amenities of a casino's resort such as its hotel and restaurants. The current practice of awarding loyalty points for playing at a table is inherently imprecise as it is based on observation of a pit boss watching a table followed by inputting the observed data, such as a player's estimated average bet and the length of time played at the table, into the casino's rewards system. Currently, the procedures and the guidelines for awarding loyalty points are not clear and transparent to most players. Similar to table gaming, the basic premise for awarding loyalty points for playing virtual games such as those played on slot machines or played online are based on the amounts wagered by a player. Overall, points awarded for playing virtual games whether played on a machine inside a casino or played online cannot be easily traced back to the wagers made by the player on a particular game.

More recently, some land-based casinos in states such as New Jersey have started offering online and mobile gambling to remote players within their own borders. Residents within the state can now wager with real money after opening an account and depositing cash into their accounts, a process that is called account wagering. Online gaming system revenues are determined by tracking a player's wins and losses on a session-by-session basis. For example, if a player's balance before playing a game is $200 and the player's balance is $140 when leaving the game after playing several rounds, then the player's loss for that session is $60 and the casino's net win is $60. Although every transaction and wager made on an online gaming system is digitally recorded, today's online gaming systems typically track and report a player's balance prior to entering a gaming session plus or minus the net win or loss for the session to arrive at the customer's balance when exiting the game. Currently, a player's account activity does not provide the functionality and data structure to easily trace back the details of a player's wager across all games played online by the player.

Game integrity is the foundation of a casino's business. Moreover, gaming regulations require that the net win of a game to be transparent and a game's random number generator to be secure. Regulators and operators gain the trust of players by offering a gambling ecosystem that makes players feel safe and not cheated. To achieve this, regulators require games to be certified by an independent gaming lab and demand owners and officers of a gaming company to undergo a comprehensive personal investigation process before they get licensed to operate a gaming establishment or engage in an online gaming operation. Casino gaming has evolved over the years with introduction of new technologies and platforms. The industry currently lacks a unified system to provide interoperability between various casino style games and also lacks a comprehensive revenue reporting solution across various gaming platforms. Presently, casinos use a combination of different systems to achieve these objectives.

The basic premise of gaming regulations is transparency, accuracy, audit traceability and security. Traditionally, casino revenues are calculated on daily basis and on a game-by-game basis by adding the "net win" of all the games offered across all its gaming platforms such as table games, slots, electronic games, virtual online games, etc. The daily net win of each game represents the difference between all the wagers placed on a game less all the payouts made by the game for the same period. The casino industry started with traditional table games such as blackjack, baccarat and roulette using chips that are uniquely designed for each casino. The latest generation of casino offerings are online gaming played with cash deposited into a wagering account. Currently there is no system in place to track a player's wagering activity across all games offered, ranging from manual games e.g. table games, to electronic games such as slots and virtual games played on online or on mobile devices.

Lately, cameras and sensors have been developed that can track objects or sense certain movements, for example in the last few years bet recognition technologies have been introduced that use specialized cameras to recognize the value of bets placed at a gaming table by counting and recognizing the value of chips wagered by a player. However, these technologies although very accurate, do not always track the total value of bets placed by a player with one hundred percent accuracy. The errors are usually caused with sudden change in lighting levels and other random conditions such as buildup of dirt on a chip. The main value of a bet recognition system is to better track the wager history of a player versus the traditional practice of pit bosses estimating a player's average bet and length of playtime, which are manually entered into a loyalty rewards system.

SUMMARY

An inter-gaming operator (IGO) server and method is described. In one embodiment, a method is performed by an inter-gaming operator computer server, for managing gaming and non-gaming transactions for a plurality of gaming operator systems, comprising, creating a first account associated with a first user in response to a request from the first user, the first account for use with a first digital currency issued by a first gaming operator system, receiving first transaction information from a first gaming operator system, the first transaction comprising a wager comprising a first amount of the first digital currency, determining that the first transaction is associated with the first user from the first transaction information, determining that the first transaction originated from a first gaming platform associated with the first gaming operator system, reducing a balance of the first account by the first amount when the first transaction originated from a first gaming platform associated with the first gaming operator system, and encrypting at least some of the transaction information to form a crypto-block accessible by the first person.

In another embodiment, an inter-gaming operator (IGO) server is described for managing gaming and non-gaming transactions for a plurality of gaming operator systems, comprising, a network interface for sending and receiving digital data over a wide-area network, a memory for storing processor-executable instructions and a plurality of user accounts, and a processor coupled to the network interface and the memory for executing the processor-executable instructions that cause the server to create, by the processor, a first account associated with a first user in response to a request from the first user received by the processor over the network interface, the first account for use with a first digital currency issued by a first gaming operator system, receive, by the processor via the network interface, first transaction information from a first gaming operator system, the first transaction comprising a wager comprising a first amount of the first digital currency, determine, by the processor, that the first transaction is associated with the first user from the first transaction information, determine, by the processor, that the first transaction originated from a first gaming platform associated with the first gaming operator system, reduce, by the processor, a balance of the first account by the first amount when the first transaction originated from a first gaming platform associated with the first gaming operator system, and encrypt, by the processor, at least some of the transaction information to form a crypto-block accessible by the first person.

BRIEF DESCRIPTION OF THE DRAWINGS

The features, advantages, and objects of the present invention will become more apparent from the detailed description as set forth below, when taken in conjunction with the drawings in which like referenced characters identify correspondingly throughout, and wherein:

FIG. 9 is an illustration of one embodiment of a database structure and permission rights for C3 as illustrated in FIG. 5;

DETAILED DESCRIPTION

Figure 1:
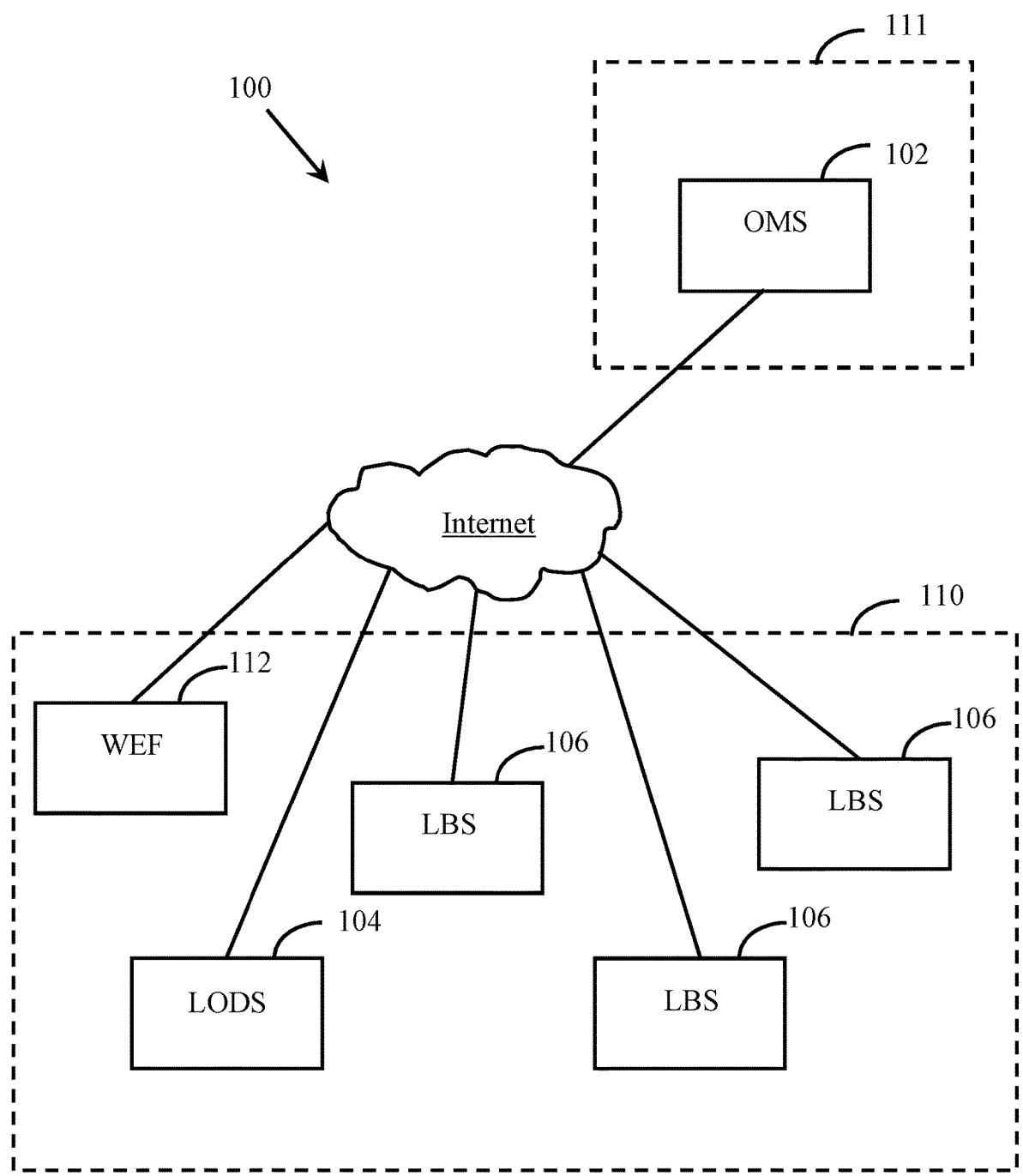
FIG. 1 is an overview diagram illustrating one embodiment of a networked wagering ecosystem.

Embodiments of the present invention comprise a networked wagering ecosystem across multiple jurisdictions, such that the servers of an Odds Management System ("OMS") in one jurisdiction sends, over a communication network, wagering odds on substantially real-time basis to a Licensed Odds Disseminator server ("LODS") who in turn distributes the odds to a Licensed Book ("LB"), both of whom are licensed to do business within a particular jurisdiction, wherein LB is an entity that accepts wagers from punters ("P). Overall, embodiments of the invention address the existing challenges, especially for time-sensitive InPlay wagers, that licensed wagering entities face for not having regulatory approval to interface their systems with unlicensed entities, and directly use odds calculated by those unlicensed entities. Embodiments of the invention provide an efficient marketplace for providing wagering odds that are legally compliant in one jurisdiction to entities located in other jurisdictions. Described herein is a technical interactivity and interoperability between a licensed entity's system and an unlicensed odds maker's system and also addresses the technology challenges of sorting through large amounts of data facing a Business-to-Consumer ("B2C") entity to identify the best odds and the bet sizes offered by third party odds providers.

Before describing the embodiments in more detail, it should be noted that the wagering industry in the U.S. started by Nevada casinos providing B2C wagering services. Nevada casinos usually use internally-generated odds and have a goal of minimizing their risks as much as possible. Risk is managed by changing the odds that they offer to punters as wagers are placed, and putting wagering limits or "caps" on wagers. Over the years, Nevada casinos have developed various types of fixed odds wagering formats. Overall, the principle of fixed odds wagering is that at the time a wager is placed, the exact payout amount is established should the wager result in a win. Fixed odds can be offered in different styles, such as straight bets, parlays, totals, money lines, spreads, propositions, teasers, if bets, etc. Also, some types of wagers may have different names, for example straight bets may be called head-to-head bets and totals might be called over and under. Regardless of the types of wagers offered, one can generally put them into three broad categories. The first category includes those that are based on a probability factor, which may be presented in different formats. However, regardless of the way they are offered, they can be translated to a probability percentage of something happening, e.g. a probability of team A prevailing over team B or a probability of a number of teams winning during a tournament as in a parlay wager.

Another category of wagers uses handicap points. For example, if in a football game, team A is favorite to win over team B by 10 points, bookmakers may level off the probability factor to 50/50 by giving one team a handicap point. These types of wagers are called spread betting whereby the favorite team must win by a spread of points, e.g. by 10 points.

Another category of betting on an outcome is binary i.e. something will either happen or not happen. Examples of binary wagering is to bet whether player X scores the first goal or not, or whether a stock price of company Y will close above $100 on a specific date. The premise behind these types of wagers is that the underlying event upon which they are based either will happen or will not happen. Regardless of how a wager is presented, one can translate the odds of a binary event to a probability factor and also calculate an expected payoff based on the event's probability and a fee charged by an operator for facilitating the wager.

It should also be noted that the embodiments described herein could be applied to almost any type of wagering event, although the examples described below cover only one or two types of wagers.

In summary, embodiments of the invention introduce technological solutions that address challenges facing the wagering industry such as compliance with regulatory requirements when accepting wagers from consumers and being restricted from having business relationships and technology interactivity with unlicensed entities in the jurisdiction. The primary reasons behind regulatory requirements are to protect consumers as well as to ensure compliance with taxation requirements. Embodiments of the invention create a technology buffer between licensed Business-to-Consumer ("B2C") entities that offer wagers to punters, and licensed entities that consolidate and disseminate their own and third party-generated odds, while facilitating interactions between Business-to-Business ("B2B") and licensed B2C entities to create a technology solution to regulatory requirements. Overall, the business model of gaming companies is to offer games that have a house edge, receive a fee for facilitating a wager, or taking a rake for offering a game that has no house edge, for example, for games that the house acts as a facilitator, such as in poker games offered inside a casino or a card club. Embodiments of the present invention also create new business opportunities for risk adverse gaming entities that avoid covering a wide range of games or do not offer an extensive number of InPlay wagers. It should also be noted that during the below examples, when reference is made to a game or an event, it may apply to fantasy games based on fantasy teams as played in fantasy sports such as DFS or any future event where an outcome is uncertain.

FIG. 1 illustrates one embodiment of a networked wagering ecosystem 100 comprising an Odds Management Server ("OMS") 102 associated with an Odds Management Service located and licensed to do business in jurisdiction 111, sending feeds of odds and bet limits of future events to a Licensed Odds Disseminator Server ("LODS") 104 associated with a Licensed Odds Disseminator service within a regulated gaming market 110, such as the state of Nevada. OMS 102 generates odds for a variety of events, including InPlay and pre-play events associated with, for example, sporting events. OMS 102 may generate these odds based on user input, i.e., management of OMS 102, and/or autonomously, for example by a processor programmed with Artificial Intelligence, such as IBM's Watson. Initial odds may be set using detailed data, statistics and historical information about past events related to the future events, such as player statistics, team statistics, etc.

LODS 104 disseminates the odds and bet limits associated with future events received from OMS 102 to one or more Licensed Book Servers ("LBS") 106 associated with a licensed gaming entity such as a casino licensed to take wagers in regulated market 110, who in turn offers wagering opportunities to their customers (known as "punters" (P) 108). Each LBS 106 provides a description of each event and the odds and wagering limits associated with each event to the punters, and the punters may place wagers on one or more future events, based on the odds and betting limits. LBS 104 may also provide odds and betting limits to Wagering Entity Fund server ("WEF") 112 associated with a Wagering Entity Fund. Wagers placed by P 108 and WEF 112 with LBS 106 are reported to LODS 104, which then reports them to OMS 102 for risk management purposes and consideration as to whether OMS 102 should change the odds and the bet limits associated with the event, based on wagers placed by punters in one or more LBSs 106 and WEF 112. The totality of wagers received from a plurality of LBSs 106 and/or WEFs 112 of a future event forms a book of OMS 102 and the goal of OMS 102 is to balance the book for each defined future event to limit losses to management of OMS 102 in case the book becomes imbalanced, based on all of the wagers received, including wagers placed by punters in jurisdiction 111 and received by OMS 102. In one embodiment, another OMS 102 provides odds and betting limits directly to WEF 112 or to LBS 106.

It should be understood that although only three LBSs 106 and one LODS 104 is shown in jurisdiction 110, in practice, there is typically many tens or hundreds of LBSs and several LODSs 104 operating in jurisdiction 110. Further, although FIG. 1 shows LODS 104 and each LBS 106 communicating with each other via the wide-area network, in other embodiments, one or more LBSs 106 may communicate directly with an LODS 104, for example over a local-area network or via some other network other than the wide-area network.

Each OMSs 102 is located outside regulated gaming market 110, while LODS 104 and LBS 106 is located within regulated gaming market 110. LODS 104 may calculate and distribute its own odds relating to an event and offer these odds, as well as the odds provided by OMS 102, to LBS 106 and/or WEF 112. OMS 102 may also provide similar services to other jurisdictions 110.

System 100 allows LBS 106 to offer wagering opportunities to its punters that it normally would not, or could not, due to a lack of liquidity that certain wagering opportunities would present. For example, if management of a casino operating LBS 106 wanted to offer a wagering opportunity for punters to place wagers on an "obscure" event, such as the outcome of a soccer game in Chile, it might find that it receives bets from only a few punters. In that event, the chances that the book would be imbalanced is high, meaning, for example, that LBS 106 might receive wagers of $1,000 that soccer team A will win, while receiving wagers of $10,000 that soccer team B will win. This imbalance would normally open management of LBS 106 to a risk that Team B would win, resulting in a large loss to management of LBS 106. System 100 eliminates this risk and shifts it to management of OMS 102, who is better able to tolerate imbalances from a single LBS 106, as OMS 102 receives wagers from many other LBS 106's located in gaming market 110, as well as other wagering/gaming markets. OMS 102 provides odds of certain future events normally unavailable to LBS 106, or on events where LBS 106 may risk low liquidity (i.e., for InPlay wagers, or foreign-based wagers), and LBS 106 offers these wagering opportunities to its customers (i.e., punters), in exchange for a guaranteed fee from OMS 102.

In one embodiment, the odds and betting limits for a variety of wagering opportunities received by LODS 104 from one or more OMSs 102 is organized, for example, by odds and/or by betting limits, and then LODS 104 makes the organized data available to one or more LBSs 106 and/or WEFs 112 within a jurisdiction where LODS 104 is located. OMS 102 may transmit the odds and bet limits to LODS 104 via a web feed, such as RSS or similar technology that provides frequently-updated data content securely to LODS 104 to either be relayed to LBS 106 or stored along with the data received from other OMSs 102 in a memory or database. If the data is stored in a database, LODS 104 may sort it by game/event, by wagering odds and/or by bet limits and relay the sorted data to LBS 106 for selection and offering to a plurality of punters. The data provided to LBSs 106 may additionally comprise an indication of a credit to one or more of the LBSs 106 for using the wagering odds provided by LODS 104 as a guaranteed fee for LBS 106 offering wagering opportunities to punters based on the wagering odds provided by OMS 102. Similar to quotes made by a stock exchange such as NADSAQ, OMS 102 creates a vigorous marketplace for LBSs 106, via LODS 104, to offer new wagering opportunities in their jurisdiction to punters based on wagering odds provided by one or more OMSs 102 located outside of the jurisdiction that the LBSs 106 are located.

It should be noted that LBS 106 and WEF 112 could be the same entity, i.e. an entity licensed to take wagers and willing to take risks, generate its own odds or purchase odds from LODS 104.

Figure 2:
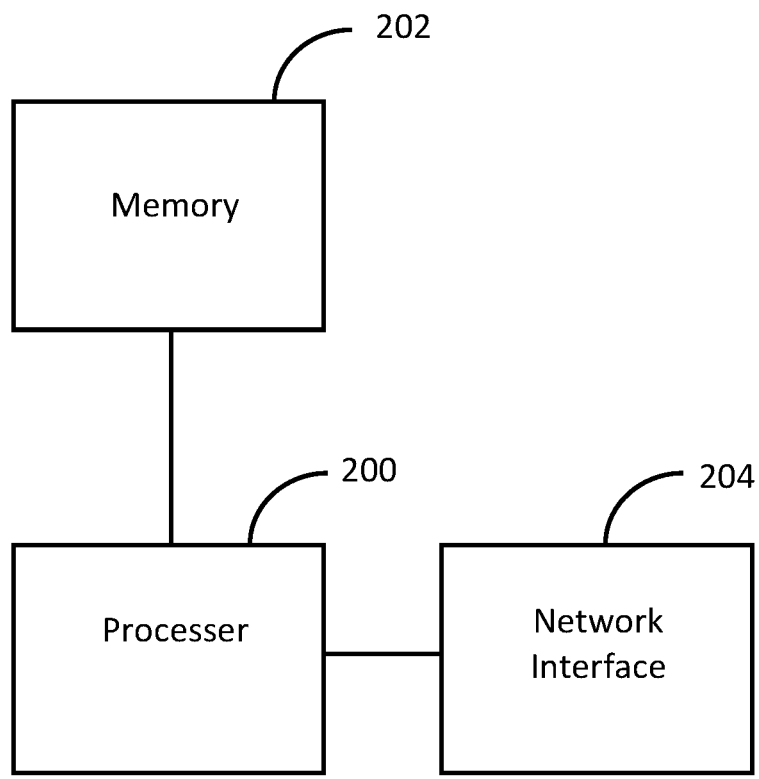
FIG. 2 is a functional block diagram of one embodiment of the LBS shown in FIG. 1 comprising processor 200, memory 202, and network interface 202.

FIG. 2 is a functional block diagram of one embodiment of LBS 106 comprising processor 200, memory 202, and network interface 202. It should be understood that OMS 102, LODS 104 and WEF 112 comprise the same or similar functional components.

Processor 200 is configured to provide general operation of LBS 106 by executing processor-executable instructions stored in memory 202, for example, executable code. Processor 200 typically comprises a general-purpose processor, such as an i5 processor manufactured by Intel Corporation of Santa Clara, Calif., although any one of a variety of microprocessors, microcomputers, and/or microcontrollers may be used alternatively.

Memory 202 comprises one or more information storage devices, such as RAM, ROM, EEPROM, UVPROM, flash memory, SD memory, XD memory, or other type of electronic, optical, or mechanical memory device. Memory 202 is used to store processor-executable instructions for operation of LBS 106, as well as any information used by processor 200 to offer new wagering opportunities to punters, such as real-time, in-game bets and bets relating to events occurring in jurisdictions other than where the an LBS 106 is located, such as wagering odds provided by LODS 104 and/or OMS 102, one or more books, each relating to a particular wagering opportunity, punter account information, account balances, etc.

Network interface 202 comprises circuitry necessary for processor 200 to communicate over one or more networks, such as the Internet and/or one or more local area networks. Such circuitry is well known in the art.

Figure 3A:
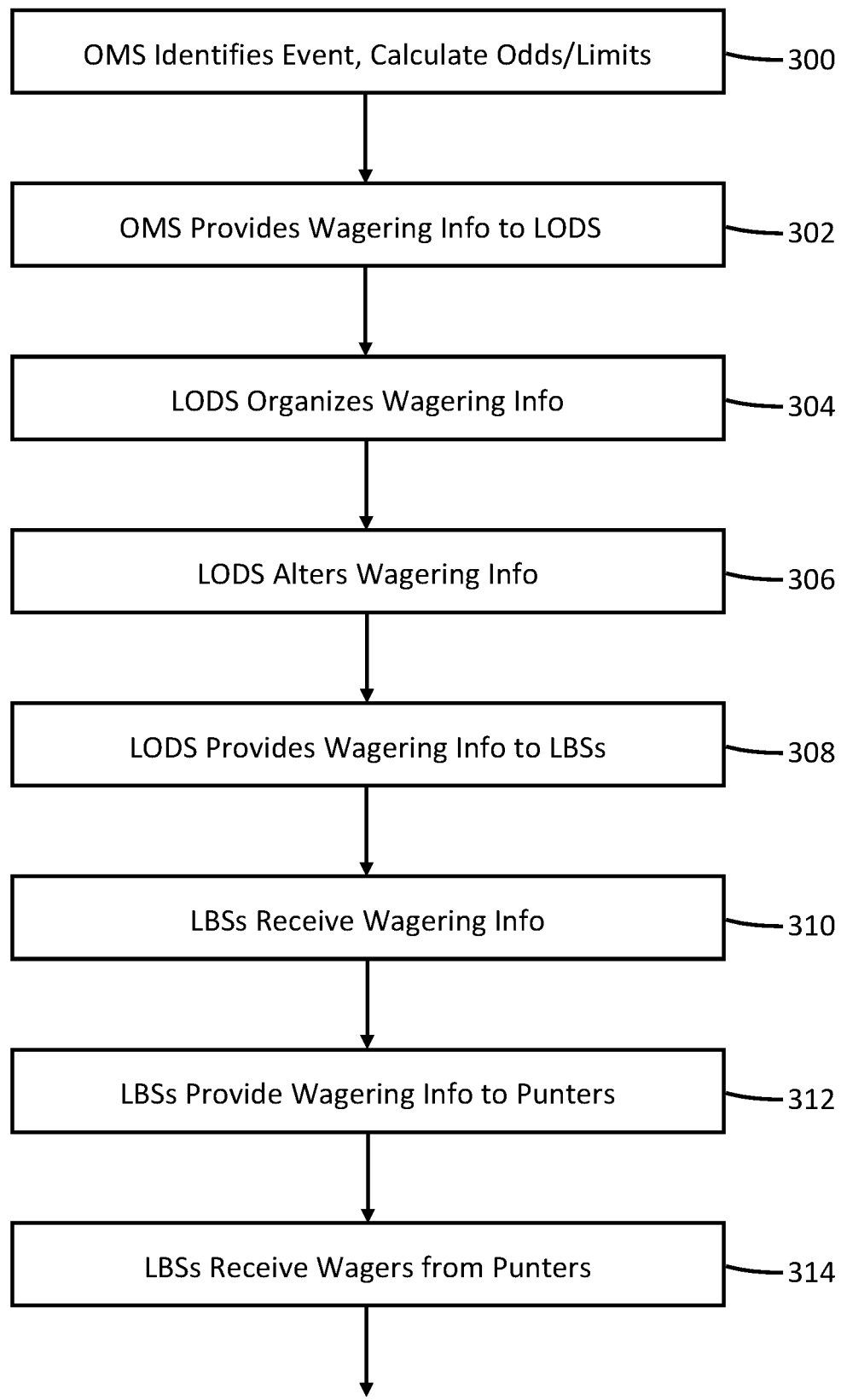
FIGS. 3A and 3B are flow diagrams illustrating one embodiment of a method for enabling the LBSs shown in FIG. 1, located in one jurisdiction to offer wagering opportunities based on future events that occur outside of the jurisdiction.
Figure 3B:
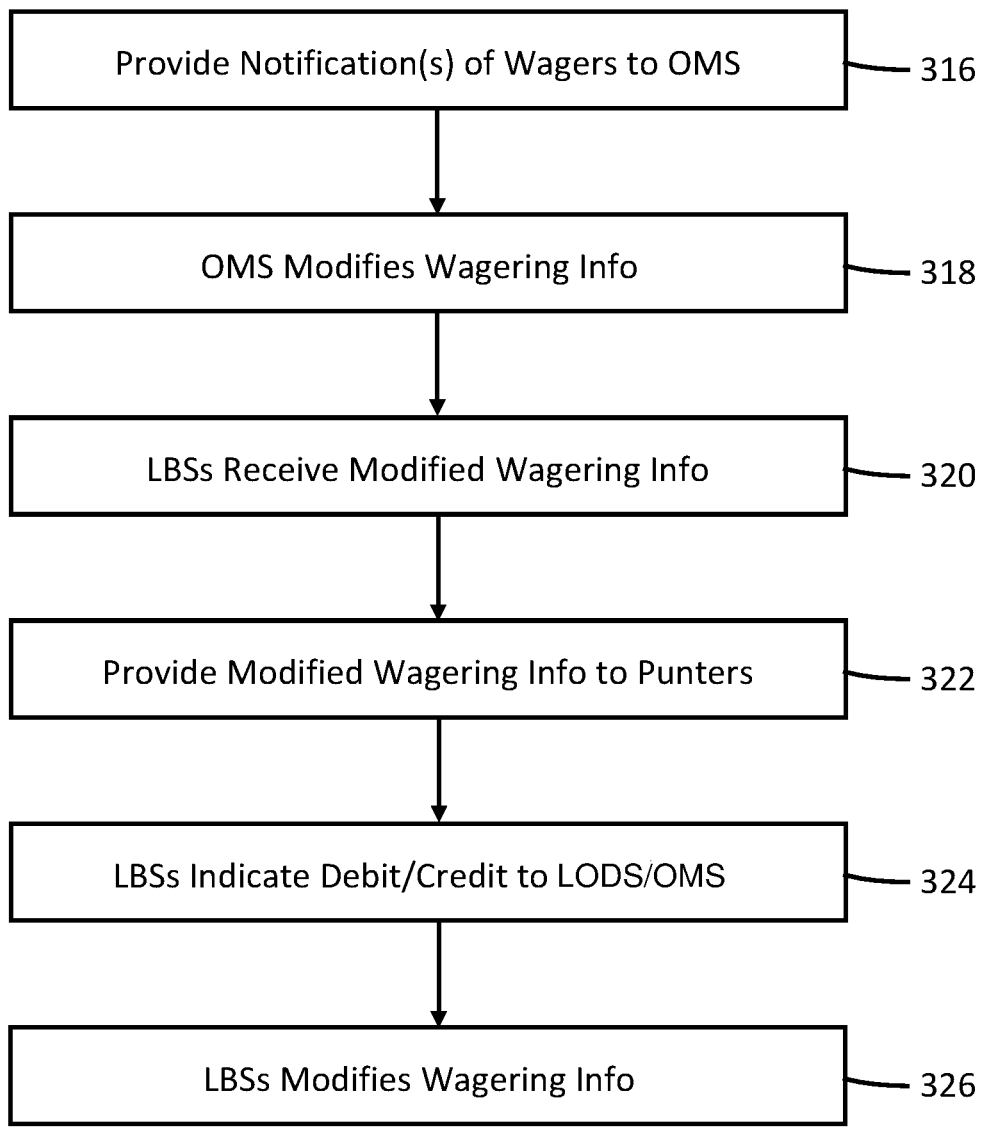

FIG. 3 is a flow diagram illustrating one embodiment of a method for enabling LBSs 106 located in one jurisdiction to offer wagering opportunities based on future events that occur outside of the jurisdiction or on any future event where LBS 106 is at risk for having an unbalanced book, such as InPlay events or "obscure" events, i.e., events not known by a vast majority of the gambling public. It should be understood that the steps described in this method could be performed in an order other than what is shown and discussed.

At block 300, OMS 102, located and licensed to do business in a first jurisdiction, identifies one or more future events and calculates wagering odds, wagering limits, end date/time for receiving wagers, or other information associated with each future event ("gaming information"). OMS 102 may identify events and calculate odds as provided by management of OMS 102, and/or it may perform these functions using artificial intelligence. The gaming information may additionally comprise a guaranteed fee to any LBS 106 who promotes the wagering opportunities to its punters located in a second jurisdiction, as will be explained below.

At block 302, OMS 102 provides an identification of the future event and the associated wagering odds and/or limits (the "gaming information") to LODS 104 via wide-area network, such as the Internet. LODS 104 is located and licensed to business in the second jurisdiction, but not the first jurisdiction. In another embodiment, OMS 102 provides the identification of the future event and associated wagering odds and/or limits directly to one or more LBSs 106.

At block 304, LODS 104 receives the gaming information associated with one or more future events, and may organize this information based on event, event type, event location, by odds, by wagering limit, etc. The information received from OMS 102 is typically stored in a memory or database associated with LODS 104.

At block 306, LODS 104 may alter the waging information provided by OMS 102. For example, LODS 104 may alter the wagering odds, wagering limits, etc. This may be performed automatically, by LODS 104 comparing the gaming information to one or more sets of pre-stored gaming information stored in an associated memory or database. For example, pre-stored gaming information may indicate that the maximum wagering limit for any wager is limited to $500. If a wagering limit received from OMS 102 is greater than this limit, LODS 104 may alter the limit received from OMS 102 to $500.

At block 308, LODS 104 provides the gaming information to one or more LBS 106, typically via the wide-area network, either in the original format as provided by OMS 102, sorted by LODS 104, and/or altered by LODS 104.

At block 310, LBS 106, located and licensed to do business in the second jurisdiction, but not in the first jurisdiction, receives the gaming information from LODS 104. The gaming information is provided to processor 200 via network interface 204. In some embodiments, the wagers include wagers tied to InPlay and pre-play events.

At block 312, processor 200 provides the wagering opportunities, including wagering odds and betting limits, to a plurality of punters. This may take the form of processor 200 updating a web page where wagering opportunities are offered to punters, and/or processor 200 may provide a signal to a display board located in one or more venues, such as casinos, where an indication of each future event may be displayed along with the wagering odds calculated by OMS 102 and/or LODS 104. Punters may place wagers on one or more of the future events, for example, online or by interacting with an agent of a venue, providing monetary value to the agent in exchange for a ticket, voucher or other proof that a wager was placed for a certain future event.

At block 314, processor 200 receives an indication via network interface 204 that one or more wagers have occurred, typically indicating an identification of a punter who placed the wager, a wager amount, an identification of the future event selected by the punter on which the wager is applicable, and/or the wagering odds. Processor 200 may store this information in memory 202.

At block 316, processor 200 may provide a notification of each wager that is received via network interface 204 to LODS 104 and/or directly to OMS 102 via the wide-area network, either as the wagers are received or at predetermined time intervals, such as every 15 minutes. The notifications may comprise an identification of LBS 106, a wager amount and an identification of the future event selected by the punter, or it may comprise, simply, a book maintained by LBS 106 regarding wagers placed on both sides of the bet for each particular wagering opportunity offered to punters. In one embodiment, the notifications are provided to LODS 104, and LODS 104 forwards the notifications to OMS 102. In one embodiment, LODS 104 may not report the wagers that can get consolidated, because their associate risks effectively offset each other. By balancing the risks associated with these wagers, LODS 104 can keep in-house the profit spreads pertinent to these wagers.

At block 318, either LODS 104 or OMS 102 may modify the wagering odds for the future event listed in a notification, based on the wagers placed by punters in the jurisdiction where LBS 106 is located, since OMS 102 is ultimately responsible for the risk of book imbalances of LBS 106 and other LBS 106's. For example, OMS 102 may provide original wagering odds regarding a future event to LODS 104 and then LODS 104 forwards the odds to LBS 106 as 2:1 that an outcome of the future event would favor outcome A vs. B. LBS 106 provides these odds to punters as explained above, and may receive $2000 in wagers that outcome A will occur, while only receiving $500 that outcome B will occur. These wagers are reported to LODS 104 and/or directly to OMS 102 to be included in OMS 102's overall risk management system serving multiple jurisdictions. In response to receiving the wager information from one or more LODSs 104 and/or one or more LBSs 106, OMS 102 may modify the odds in order to reduce a risk of loss due to an imbalance that may occur based on the totality of wager information received from all LBSs 106. For example, OMS 102 might modify the 2:1 odds to 4:1 in an attempt to balance its own book. The modified odds are then provided to any LBS 106 that is offering wagering opportunities of the future event associated with the odds change, either directly or via one or more LODSs 104. When processor 200 determines that a book related to a future event is out of balance by more than a predetermined amount, processor 200 may change the odds relating to the event in order to attempt to bring the book back in balance. The predetermined amount could comprise a percentage of the potential loss to OMS 102 or a potential dollar loss in the event that OMS 102 would have to pay out more than it received in wagers from multiple ones of the LBSs 106.

At block 320, the modified odds are received by processor 200 via network interface 204, either directly from OMS 102 or from LODS 104.

At block 322, processor 200 provides the modified wagering odds for the future event to punters via network interface 204. Thereafter, LBS 106 receives wagers for the future event from punters based on the modified wagering odds.

At block 324, LBS 106 may provide a debit or a credit to OMS 102 or LODS 104 based on contractually-guaranteed fees provided from OMS 102 or LODS 104 to LBS 106 for LBS 106 using the wagering odds provided by OMS 102 or LODS 104 and based on the payouts by LBS 106 to punters who won wagers on the future event.

For example, LBS 106 may receive wagering odds of a future event from LODS 104 when LODS 104 receives the wagering odds from OMS 102, where OMS 102 is located outside the jurisdiction where LODS 104 and LBS 106 are located. The owners of OMS 102 or LODS 104 may be contractually obligated to provide LBS 106 a guaranteed fee in exchange for promoting betting on future events occurring outside the jurisdiction where LODS 104 or LBS 106 are located. In one embodiment, a guaranteed fee might comprise a fixed percentage of all wagers received by LBS 106 for each future event promoted to punters by LBS 106, such as 2%.

In one example, if a future event comprises a sporting event played by teams A and B against each other, OMS 102 or LODS 104 may provide wagering odds to LBS 106 that team A is favored to win against team B by 10 points. LBS 106 promotes this event and the wagering odds provided from either OMS 102 and/or LODS 104 to punters and receives $11,000 in wagers for team A to win and $5,500 in wagers for team B to win, i.e. LBS 106 receives a total "handle" of $16,500. If team A wins, then LBS 106 must provide a payout to winning punters who wagered on team A in the amount of $20,000, according to a traditional business model of betting $11 to win $10. This results in a net loss to LBS 106 of $3,500 ($16,500 received and $20,000 paid out). In this example, LBS 106 determines the net profit or loss after game has concluded and provides a notification to LODS 104 or OMS 102 of the net loss or profit. In this case, LBS 104 notifies OMS 102 and/or LODS 104 of the $3,500 cash flow shortfall ($20,000 in winner payouts less $16,500 in total wagers received and adds the guaranteed fee of $330 ($16,500×2%) to the amount that LODS has to compensate LBS for this event. LODS 104 or OMS 102, in turn, provides LBS 106 a credit in the amount reported by LBS 106. LBS 106 may report such profits, losses and fees for a specified period, such as a week or a month, and LODS 104 or OMS 102 may settle with each other at these time intervals or some other time interval. Moreover, a similar arrangement may be in place between LODS 104 and OMS 102, where OMS 102 provides a guaranteed fee to LODS 104 for LODS 104 distributing the wagering odds from OMS 102 to LBSs 106 in LODS 104's jurisdiction. In this case, LODS 104 reports to OMS 102 the results of all wagers placed by all LBSs 106 that used the wagering odds from OMS 102.

Continuing with the example above, if $5,500 was wagered on team A and $11,000 was wagered on team B, and team A won, then LBS 106 would have to pay $10,000 to the winners which, when subtracted from the total handle of $16,500, results in a net profit of $6,500 to LBS 106, plus the guaranteed fee of $330. LBS 106, then, would report a credit to LODS 104 or OMS 102 of either the grand total of $6,170 ($6,500 less $330) or it would provide the net profit and guaranteed fee separately. Assuming that LODS 104 makes 1% on all wagers from OMS 102 for wagers placed through multiple LBSs 106s who received the wagering odds from LODS 104, the settlement between OMS 102 and LODS 104 will reflect the accounting between LODS 104 and all LBS 106 entities that took wagers from punters based on the guaranteed fee arrangements. It should be noted that the fee percentages may vary. For example, InPlay wagers may have a higher fee than pre-match wagers, and also the fee percentages may vary by game or by types of wagers.

At block 326, LBS 106 may decide to adjust the wagering odds or its fees with LODS 104 using LOD's Routing and Management System ("RMS"). The RMS system is an interface system that manages the feed of gaming information between LODS 104 and LBS 106 and manages other data such as wagers taken by each LBS 106. The decision to change the odds may be for marketing reasons to distinguish one LBS 106 from a competing, other LBS 106 who offer the same odds disseminated by LODS 104. Using the above example where team A is favorite to win over team B by 10 points, if LBS 106 changes the spread to 12 (from 10), and team A wins by 11 points, then LBS 106 would not have to pay punters who wagered on team A, because LBS 106 changed the spread. In such cases, LBS 106 keeps the profit on these wagers in-house without having to account to LODS 104 or OMS 102. Conversely, if LBS 106 changed the 10-point spread to 8 points, and team A won by 9 points, LBS 106 would lose on these wagers and has to pay punters who bet on team A without getting compensated from LBS 106 because it changed the odds offered by LODS. In another embodiment, when LODS uses the odds from several OMS's for an event, the RMS may handle the routing of the event and odds selection from one or more OMS 102's to one or more LBS 106's. LODS 104 staff may use an administration terminal to access a database associated with LODS 104 and/or staff at LBS 106 may use an administration terminal to access the same database to select and order wagering odds for future events or upcoming sporting matches that LBS 106 is interested to offer to its punters P using the odds provisioning service offered by LODS 104/OMS 102. The RMS may also provide customization options for LBS 106 staff to adjust the wager odds and guaranteed fees by an amount such as one or more percentage points, to aid LBS 106 in distinguishing its offerings from other LBSs 106. Any modifications made are stored in the database associated with LODS 104. As an example, if fees associated with odds related to a tennis match and provided by LODS 104 to LBS 106 for InPlay wagers are 8%, LBS 106 may request to LODS 104 that the fee be increased an additional 2 percentage points, or 10%. Such modifications allow LBS 106 to have the flexibility to customize its own odds and fees around its business and marketing plans.

Figure 4:
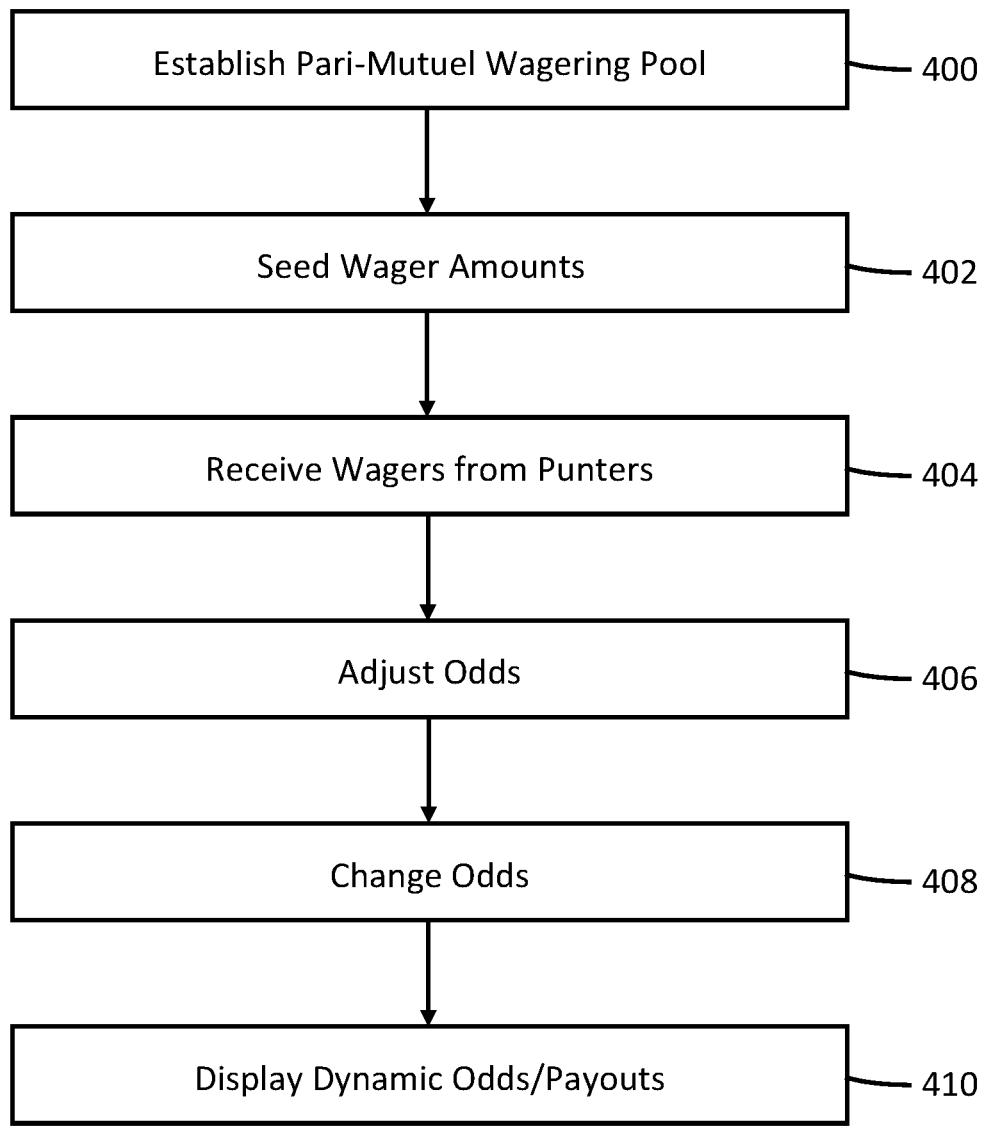
FIG. 4 is a flow diagram illustrating one embodiment of a method performed by the LBS or WEF shown in FIG. 1, acting as a wagering fund prepared to take risk, which may either get licensed as a book or cooperate with one or more existing books to offer "hybrid" wagering.

FIG. 4 is a flow diagram illustrating one embodiment of a method performed by LBS 106 or WEF 112, acting as a wagering fund prepared to take risk, which may either get licensed as a book or cooperate with one or more existing books to offer "hybrid" wagering, i.e. a combination of fixed odds and pari-mutuel wagering. In this embodiment, after paying fixed odds winners and fees associated with both the fixed odds and the pari-mutuel wagers, LBS 106 or WEF 112 distributes the remaining balance in a betting pool to winners proportional to their wagers. A hybrid-wagering framework allows punters who prefer fixed odds to participate in placing wagers on games with those who are participating in a pari-mutuel format. Having both fixed odds and pari-mutuel stakeholders willing to take risk in one pool can create a bigger and more robust market than having a number of individual pools of fixed odds, with each entity trying to balance its own book. By using historical data and statistical analysis that generates odds with higher win probabilities and implementing arbitrage with other books, a wagering fund associated with WEF 112, for example, could take calculated risks and produce above average returns for its investors. This system and process of offering fixed odds within a pari-mutuel framework could create an attractive wagering venue for both average punters, who would prefer fixed odds, and also provide a robust market for those who are willing to take more risk and in return receive better returns. In one embodiment, one or more wagering funds willing to take more risk may guarantee the pari-mutuel participants a payout range if their wagers prevail. The model supports having different classes of pari-mutuel bettors which takes into account the general principle of those who take more risks have the potential for more rewards. It should be understood that the steps described in this method could be performed in an order other than what is shown and discussed. It should also be understood that although the following discussion references only WEF 112, the same principles could be applied to LBS 106. Finally, it should be understood that WEF 112 comprises the same functional components as LBS 106, shown in FIG. 3, and reference will be made to these components during the following discussion.

At block 400, WEF 112 may either by itself or in partnership with LBS 106, establish a pari-mutuel wagering pool for a game or an event in response to input from management of WEF 112 via network interface 204 or a user input device, such as a mouse/keyboard (not shown). In response, processor 200 provides a notice of wagering opportunities for the game or event to punters in a casino via network interface 204 and one or more displays located inside the casino. The notice includes fixed odds, as generated by LBS 106, WEF 112, LODS 104 or OMS 102, as well as an indication that a pan-mutual payout will also occur. Processor 200 may additionally create a data record for storage in memory 202 of the wagering pool to track wagers placed by punters on either side of the wager. Such a data record may comprise an identification of the game or event, initial wagering odds, total wagers placed on one side of the bet and total wagers for the other side of the bet. A wager size limit may also be determined by management and provided to processor 200, which includes the wager size limit in the data record. Finally, a risk amount may be defined as the maximum dollar amount a risk manager/management of a book or a fund would be willing to lose if the outcome of the event is unfavorable to a position that management could take in the outcome of the event.

At block 402, processor 200 may seed one of the total wager amounts stored in the data record with an amount that is based on a probability factor for the wining side that is either internally generated by processor 200, provided by management, or offered by a third party. As an example, processor 200 may receive from LODS 104 or OMS 102 wagering odds that team A is a 2-to-1 favorite to win against team B and, in response, processor 200 may seed the total wagers placed for team A, as stored in by the data record, in an amount of $50 and seed the total wagers for team B in an amount of $100. In another example, if the wagering odds comprise a point spread, and team A is favorite to win by 10 points against team B, each of the total wagers for each of team A and team B may be seeded with the same amount, e.g. $100. Seeding both sides maybe in line with the expected payoff including any fees or those offered by a traditional fixed odds bookmaker, for example, if team A wins by at least 10 points, an $11 wager on team A wins $21 which includes a $1 fee for the bookmaker.

At block 404, processor 200 begins receiving wagers from punters via network interface 204. As the wagers are received, they are stored in memory 202.

At block 406, processor 200 may perform an adjustment of the odds, maximum wager allowed, and/or place a wager on one side if the pari-mutuel pool starts to become imbalanced. The adjustment may be performed automatically, by evaluating the wagers placed on both sides of the bet and determining when one balance is greater than the other balance by a predetermined amount and comparing the imbalance with criteria stored in memory 202, such as the maximum risk limit, or a stored ratio of one side of the bet vs. the other, or some other factor that indicates that the pool has become unbalanced, meaning that the wagers placed are not in proportion to expected wagers based on the odds provided to the punters.

As an example, if the wagering odds are 2-to-1 in favor of team A beating team B, and the maximum risk limit is defined as $50,000, processor 200 may begin reducing a wager size limit that punters may place on a sliding scale on one side of the bet, reduce the maximum wager limit and/or place a bet on one side or the other, either through an automated (via processor 200) or a manual (i.e., management) process, if one side of the bet moves away more than a pre-established threshold from the 2-to-1 probability factor. Each time the thresholds are hit, processor 200 automatically makes an adjustment or sends an alert to an operator to provide input to processor 200 for processor 200 to make an adjustment. By the way of an example, one may expect that given odds of 2-to-1 in the above example, if $100,000 is wagered on team A to win, the wagers for team B should be roughly $50,000. However, when the total wagered amount on team B is $80,000 and on team A is $100,000, and the wagering odds remain at 2-to-1, management of WEF 112 could have a $60,000 loss in the event that Team B wins (Total take=$180,000, less (2:1 payout to wagers placed on team B=$160 k plus return of wagers to punters who placed wagers on team B=$80 k)). To bring the wagers in line with the odds of the event, in one embodiment, processor 200 determines the exposure or amount that management of WEF 112 could lose, based on the wagers placed, and "wagers" $30,000 on team A to win and, in one embodiment, change the wagering limits that a punter can place on the event, for example, new wagering odds of 1.25:1 that team A will beat team B, which is in conformance with actual wagers received by processor 200 when the wagering odds were at 2:1. In other embodiments, processor 200 reduces the maximum bet allowed for team A or reduces the odds from 2:1 to something less.

At block 408, after setting up the pool (i.e., generating a wagering record of the event for storage memory 202 and promoting the event to punters), the odds of an event may change. For example, a key player may become injured, or OMS 102 and/or LODS 104 modify the odds based on wagers received. In this case, processor 200 calculates new odds based on a changed circumstance, may suspend accepting new wagers from punters and/or may start a new pool using the modified odds, and then provides the changed odds to punters.

In one embodiment, processor 200 may guarantee a minimum or a range of payouts if a wager prevails. In such situations, any monetary deficiencies have to be covered by the risk dollars set aside associated with the odds offered for the event. If the system offers these types of guarantees, then the hybrid system has to be more sensitive to the wager limits and adjust them more frequently. In one embodiment, one or more pari-mutuel participants e.g. WE 112 may take the most risks and guarantee a range of payouts for the other pari-mutuel participants if their wager prevails. For example, if the probability of a team winning is 2 to 1, the payout to a class of pari-mutuel participants may range between 3/2 to 1 and 3 to 1 if their wager wins. In such cases, those taking the most risk, for example WE 112 will stand to receive the most rewards by sweeping the remaining balance in certain circumstances, which might translate to a higher payout e.g. 5 to 1.

At block 410, during the open period prior to the event, when processor 200 permits wagering on the event, processor 200 may dynamically display the odds or payoffs for a pari-mutuel bettor based on the current status of wagers placed. Once the event is finished and the results are established at block 410, i.e., processor 200 receives an indication via communication interface 204 of a result of the event, processor 200 provides a credit to the fixed odds winners in accordance with the odds when the winners placed their wagers, as well as fees due to WEF 112, i.e., as a fixed percentage of the total pool for hosting the pool, before processor 200 provides credit to the pari-mutuel winners. Processor 200 credits winners by sending payout information based on the wagers and the odds when the wagers were placed, as retrieved from memory 202, to one or more network-based terminals inside a venue where the bets were placed or over a wide-area network to online winners.

By offering hybrid wagers, i.e. a blend of fixed odds and pari-mutuel wagering, together with an interactive market and competitive odds for wagering on sports and uncertain future events, allows entities such as WEF 112 to act as an investment fund for investors that are willing to participate in high-risk and high-reward transactions that a traditional licensed bookmaker, whose primarily goal is to mitigate risks and balance it book, shies away from.

In another embodiment, an industry-wide, digital gaming currency and blockchain accounting system is described, that effectively replaces existing casino currencies, which may be used by gaming system operators to determine gaming revenues across all gaming platforms. The embodiments described herein may also be used to generate data and metrics for awarding loyalty points to players for wagers placed inside a gaming establishment as well as games played online. Such data/metrics may comprise including players' names/IDs, game IDs, wager amounts, times when wagers are placed, and results of wagers. Embodiments of the invention introduce a digital casino chip/currency, referred from hereon as Casino Crypto Currency (from heron abbreviated to C3). A user or an application can access the user's C3 with one or two private keys to securely read or record a wager and its result. In addition, C3 may be used to conduct non-wagering transactions, such as the purchase of food and beverages, clothing, jewelry, or other goods or services, associated with a particular gaming establishment, in one embodiment.

Cryptography is a methodology for storing data securely into a database and ensuring only those who are authorized can access the data. Access to each record of C3 may be based on pre-assigned permission rights as stipulated by gaming laws and regulators of a particular jurisdiction. Storing C3 into a centralized ledger includes generating a hash string of data that is immutable and is time stamped. The creation and recording of C3 transactions into a centralized ledger include creation of a fingerprint i.e. a digital signature that at any subsequent point in future can prove the data's integrity by regenerating its fingerprint and comparing it with the original fingerprint stored in a database to prove the data remained unaltered since first writing the hash to the centralized ledger.

C3 is a virtual currency created and stored in a combination of central and distributed ledgers under the control of a licensed inter-gaming operator ("IGO"), which issues C3 as a cross-platform virtual currency. In the case of sports wagering, an IGO could manage the operability of an Odds Management System ("OMS") provider, similar to a market maker of a stock or a futures exchange whose job is to create an orderly market for both sides of a transaction. As described in U.S. patent application Ser. No. 15/436,600, an OMS may collaborate with a Wagering Entity Fund ("WEF") to help balance its book. Additionally, an OMS and or a WEF may insure or reinsure all or some of their risks with one or more insurance or reinsurance companies. Overall, as wagering expands across many states and becomes more digital via websites, financial institutions and insurance companies may want to get involve in the business and may introduce their own blockchain technologies and cryptocurrencies that are interoperable with C3, thus providing more transparency and liquidity to the wagering business, which ultimately may benefit the average sports fan that is betting on a sports wagering event. Additional financial institution participation may also help to drive illegal sportsbook operators out of the marketplace, whose activities are estimated to be in billions of dollars. IGO's servers, together with other connected servers, create a distributed ledger to maintain and track transactions involving C3, such as gaming transactions and non-gaming transactions.

An IGO may comprise a casino operator licensed by a regulator or it may comprise an entity providing such a service to one or more gaming system operators. In one embodiment, multiple IGO's may serve the casino industry with each IGO being licensed by one or more regulators following the laws of the jurisdiction that their particular casinos operate in. C3 is a cryptographic currency that has chains of records tied together in blocks that may include player and game data on a distributed ledger with each transaction having immutable records to make fraudulent misuse of its data almost impossible. The chains of records maybe tied together using a unique ID such as the player's social security number, driver's license number together with the issuing state or the player's biometrics e.g. fingerprints, face recognition, etc. The use of a unique ID for each player and associating it with each wager on an immutable distributed ledger makes a C3 account to be a historical gaming ledger for each player. Furthermore, an IGO may be the only entity that could create a C3 account and convert the currency value of C3 to a legal tender such as U.S. dollar or another virtual currency.

Embodiments of the invention allow for a user's C3 to be managed by a digital wallet, where a user may "spend" his or her C3 on goods and services that accept C3. In one embodiment, merchants associated with a particular gaming system operator, such as internal or external restaurants, shops, spas, and hotels of a casino operator, may each register with one or more IGOs. "Associated with" means owned by, authorized by, licensed by, and/or using the same C3. This process allows a C3 to be used over and over for gaming and other forms of commerce without the need to be redeemed and reissued every time. Use of C3 for both gaming and non-gaming means C3 is maintained on a hybrid blockchain, i.e. C3 offers both the benefit of private and public blockchain through a middleware or a platform that converges the functionalities of public and private blockchain networks. Gaming data related to a user's wagers is recorded in a private database over a private network associated with each gaming operator, accessible only by authorized personnel, such as gaming operators and regulators, and non-gaming data may be maintained on a public network. The private network generates hash values of all transactions and stores resulting crypto-blocks on a blockchain network or in a local memory or database. The hybrid format of C3 allows flexibility i.e. its gaming-related data stays private on IGO servers for security and auditability purposes and the non-gaming data is shared publicly on a public network that ensures every transaction is verifiable by an immutable record on a public blockchain platform such as Ethereum. In its public state, each transaction gets approved by a secure and trustworthy network thus making it difficult for a single public actor to meddle with the transactions or entries.

C3 is a secure, transparent and immutable currency issued and managed by IGO that makes the C3 balances available on both private and public networks, restricting the right to view certain transaction details of wager-related transactions. C3's hybrid nature means every device running a public node in the network has a ledger stored on its local machine and private nodes are connected to one or more IGO' s via one or more networks that contains all gaming transactions that have been validated and put into a block. It should also be mentioned that some parts of C3 data maybe be encrypted using conventional methods before hashed.

C3 may create labor efficiencies within the gaming industry and reduce credit card transaction fees for casinos and those merchants that collaborate with an IGO to accept C3 in commerce. Using C3 as a platform-agnostic currency resolves issues that arise by having to manage a variety of currencies, such as cash, chips, vouchers, TITO, account wagering, casino credit and loyalty points. Using C3 consolidates one or more existing casino currencies into one digital currency, which may comprise historical wagering data to help a gaming operator to streamline its business, save on credit card transaction fees and have a better reporting system. Currently, operators use different sportsbook systems, which makes it very difficult to identify suspicious wagers placed on a sporting event. However, C3 may be used to maintain a historical database of wagers made on a sporting match to deter bad actors profiting from fixing an event's result or laundering money by placing large wagers with one or more operators In another embodiment, a win recognition system is described that recognizes a player's win amount by counting and recognizing the value of chips paid to a player after the conclusion of each round of play. In a related embodiment, a miniaturized camera may be placed into a chip tray of a table game that can recognize the total chip inventory, including the number and denomination of the chips, within a chip tray at any given moment. A software solution that includes a win recognition system could flag some of the potential errors of a bet recognition system that utilizes cameras to make determinations. For example, if a bet recognition system reported that a player wagered $55 at a blackjack table by reading a wager as two $25 chips and one $5 chip, and a win recognition system incorrectly reads the winning chips as three $5 chips i.e. $15 in win amount, then the win determination system may flag the dealer to investigate and correct the inconsistency, which might have occurred either during the bet recognition or during the win recognition process. In one embodiment, the payout logic of a game could be part of the win recognition system. For example, if the bet recognition system reads a $10 wager and the win recognition reads $15 in winning chips, then the win recognition system may report just a cautionary warning signal and not an error because most likely the player had a blackjack and was correctly paid 3-2.

Combining bet recognition with win recognition and a chip tray inventory recognition can create a fully-integrated solution that decreases the possibility of chip reading errors going unnoticed. Taking the above scenario as an example, if a win recognition system reported that the player had a blackjack, then the $15 payout is expected and is not flagged as an error. However, if the card recognition system reported that the player had twenty, e.g. two tens, then the program would flag an error. Overall, win recognition, chip tray inventory and card recognition systems provide additional checks and balances to a bet recognition system in identifying a misreading, which typically happens due to environmental interferences. Because the readings of each recognition system occur at different times, the probability of an error going undetected is reduced when combining two of the above described interdependent systems and even further reduced when there is interoperability between three or four of the systems described above.

In one embodiment, C3 could automatically integrate the readings of a bet recognition system for the purpose of awarding a player with rewards, as well as the readings of a win recognition system for the purpose of rating a player and profiling a player. Moreover, a program combined with bet recognition, card recognition, win recognition and chip inventory recognition can provide real-time win and loss accounting for a table game when using traditional casino chips, as well as better rating players and rewarding them while the industry fully transitions from physical chips to C3.

The more players that are registered with an account that has a unique identifier for each player on a distributed ledger such as C3, the more efficient the industry may become, which would also benefit consumers. For example, if a player scans a QR barcode at a gaming table using a QR reader app installed on his or her phone and is prompted to register or login to his or her C3 account, the player then can either use his or her C3 wallet to place a wager at a C3-enabled table or use regular casino chips and a bet/win recognition system installed at the table. The player may then connect to a gaming server or loyalty server coupled to a bet determination system at the table through the Internet or a local WIFI network to receive loyalty points on real time basis.

The central ledger kept by IGO servers ensures integrity of C3 records and an audit trail that is visible only to authorized entities, such as operators and regulators, who are assigned one or more private keys to access C3 records. For example, the personal and gaming history of a C3 holder may not be visible to a merchant taking C3 from a person buying a cup of coffee at the casino resort's coffee shop but is available to the casino operator and gaming regulators who have jurisdiction on the operation of the IGO and/or a related casino.

In one embodiment, gaming and non-gaming transaction data may be maintained by an IGO, while a subset of such transaction data, such as a running account balance, transaction prices (i.e., wager amounts, payoffs received, prices paid for goods and services), and the dates and times of the transactions are verified by a public, distributed ledger. In another embodiment, gaming transaction data is maintained by a private server, such as casino server, and a subset of the gaming transaction data is provided to IGO (such as net wagering result). In this embodiment, for every gaming transaction, the IGO updates a user's account balance and verifies the account balance using the public, distributed ledger. In any case, users may be issued one or more private keys or a combination of one or more public keys and private keys to access either the gaming and/or non-gaming transaction data. For example, a merchant may only be able to verify the validity of C3 and an account balance, while a casino, regulator or government agency could access the details of gaming transactions, including an identity of a person converting cash into C3 and those converting C3 to a legal tender such as cash or other tenders such as a digital currency.

One of the properties of C3 is incorporation of the principle of Know Your Customer (KYC) as its foundation, which corresponds with the strict KYC standards of regulated online gaming. A benefit of C3 includes its application in sports wagering to deter match fixing and money laundering by bad actors by creating a C3 sports wagering integrity database that links and aggregate all wagers made by one person on an event on one or more Licensed Book Servers ("LBS") and creates an alert if the person exceeds a pre-established amount or has placed opposite wagers on an event. The alert may be determined by one or more LBS servers or Odds Management System ("OMS") servers, which manages the odds of an event and distributed to LBSs through a Licensed Odds Disseminator Server ("LODS") as described in U.S. patent application Ser. No. 15/436,600. Overall, the integrity database created by C3 has the ability to identify a person that tries to avoid getting the attention of operators, regulators and law enforcement agencies by placing wagers across multiple operators covering an event. A C3 wallet could be used as a one-to-one-ID system, requiring players to use unique ID's, restricting each player to only one C3 account, and thus allowing C3 to emulate a gaming card that can use with different operators. Online gaming and sports wagering operators have to follow a KYC registration process and request valid ID's to avoid registering those who present fake ID's. C3's unique ID could be a social security number, a driver license number, or a biometric data such as a fingerprint or facial recognition. The IGO may assign one private key to every registrant and a public key to a licensed operator.

While the industry develops a fully interoperable and interactive process for wagers to be received and included in an odds management calculation, a simple version of OMS could act as a central database for creating odds based on a summarized total of wagers, rather than individual wagers received from participating operators to calculate up to date odds that are generated from the aggregate data. The wager information communication and the database maybe kept on a private or a public blockchain that creates updated odds that are reported back to participating operators on a periodic basis. With the new wagering odds sent to operators, they are given the opportunity to change their odds to reduce the risk of sports data analysts, i.e. wise guys taking advantage of their uncompetitive odds by placing wagers and hedging their risks with another operator. The process of aggregating the wagers taken by all participating operators is to create an ecosystem that would make the job of wise guys more difficult to get in between different operators to profit from their odds discrepancies.

The C3 sports wagering integrity database may automatically alert regulators, sports leagues or law enforcement officers when total wagers for an event placed by one person on one or more LBSs exceeds a threshold, thus creating an alarm for match-fixing that may justify further investigations. The threshold amount could have different limits depending on the type of games, the type of events and the volume of wagers. For example, the limit for the final result of an NFL game could be much larger than those set for an NCAA game or a tennis match, or for an in-game wager where patrons can bet during a game as to the outcome of an upcoming event. The capture of wagers and associated data could be performed in real time, i.e. recorded at the time wagers are placed, or they may be posted at a later date, i.e. at the end of each day, in which case the data could be downloaded from an operator's gaming and wagering system and uploaded to the C3 sports wagering integrity database or through a menu by manually inputting the data into the C3 sports wagering integrity database.

IGO servers create C3 wallets when users register and fund their accounts with legal tenders such as US dollar or a verifiable virtual currency. Registered users may log into their wallets over a secure network and select an amount to be placed as a wager on a game. The transfer of funds maybe encrypted end-to-end and may use available technologies such as QR codes, near field communications (NFC) or other methods to transfer funds securely across wired or wireless networks. Moreover, a user or a player need not necessarily be connected to the Internet to use his or her C3 wallet. The placement of a wager or the transfer of C3 funds could happen if a user and a IGO are on the same network, i.e. without the need to be connected to the Internet for transmitting information such as the player's ID, the game ID and the amount of C3 to be transferred from the user's C3 wallet as a wager on a gaming device.

Regulated gaming requires transparency, thus use of Bitcoin and any virtual currencies that are based on anonymity and no central repository source, are not appropriate. Moreover, virtual currencies that are not regulated and are not linked to a person's identity, could have their supplies increase by "miners" and their prices could fluctuate based on supply and demand. Additionally, lack of regulations and an increase in the supply of a virtual currency generally do not meet gaming standards of a highly-regulated jurisdiction. Furthermore, virtual currencies such as Bitcoin, by their nature, operate on decentralized systems and require several confirmations of past transactions. Another drawback of Bitcoin is that each Bitcoin's block confirmation could take an average of 10 minutes. To reasonably ensure validity of a Bitcoin transfer, confirmation of 6 blocks or more are usually required, therefore making a Bitcoin transfer a lengthy process. The fundamental principle behind C3 is that its data associated with transactions stored on private, centralized servers. The issuance and redemption of C3 is performed by licensed and regulated entities, and the conversion rate between C3 and its underlying currency, say U.S. dollars, is conducted at a fixed rate. As an example, a user may convert $100 to 100 units of C3 and similarly may convert back 100 units of C3 to $100, all done at a fixed rate. Another inventive feature of C3 is its data structure and its access rights. The administration of a C3 is performed by an IGO that can issue and redeem the currency as well as validate and ensure its integrity. An IGO's server maintains a sequential record of each wager or transaction associated with a C3 wallet until redeemed for cash or exchanged for other legal tenders. Participating gaming operators, recipients and merchants receiving C3 can verify its validity from the issuing IGO. They can also request an IGO to redeem a C3 in exchange for an authorized legal tender such as cash or another virtual currency. Moreover, a C3's ecosystem and technology process allow a person owning C3 to split it into multiple C3's or merge several C3's into one C3 adding up to the same number of C3 units. All such transactions are cryptographically tracked and stored in a sequential blockchain.

The placement of a C3 wager is made via devices that can communicate the wager to an operator's gaming system. This wagering process may be accomplished by a variety of mediums such as a printed image e.g. a QR code, wired or wireless communications that securely send data to and from a user's device, e.g. a player's smartphone that executes a casino gaming app. It should also be noted that the device the player uses to place a wager, especially in the case of games offered in a land-based casino, may comprise a device owned and administered by the casino. In such cases, a player may securely log into the player's C3 wallet and/or the casino gaming system and/or an IGO using the device with his or her login password, private keys and credentials. Regardless of the software, hardware or the communication protocols used, a player can securely access his or her C3 using a private key administered by IGO, its servers and its database. Similarly, the casino's system that accepts C3 wagers may also be securely connected to one or more IGO servers and to a distributed network of gaming operators and participating merchants.

In one embodiment, when a player places a wager, an IGO server records all the wager information into its central database for recordkeeping purposes, independent of the gaming system that received the wager and established an outcome of the wager. The records kept by IGO servers may include a player ID, a game ID, a session ID, a wager amount, a time of the wager, a game outcome, etc. along with one or more hash totals that is/are generated during the record-storage process. In this way, the IGO server acts as a separate ledger from a ledger kept by a gaming operator in managing their operations. The IGO server maintains historical information related to a wager, such as its outcome, create a more comprehensive accounting report and an audit process that could work across an operator's entire enterprise. An IGO server may act as a subsidiary ledger i.e. a ledger used to keep additional records over and above those currently kept by existing gaming operators. For example, if a C3 wager is made on a slot machine, the slot machine may determine an outcome, and a slot accounting system may record the slot machine's net results and report each gaming transaction to a IGO server, i.e., either detailed information (such as a wager amount and/or a payoff amount), or more general information (such as the net win/loss for each gaming transaction). Similarly, if a wager is placed over the Internet, an online gaming system may keep track of the wagers placed and their outcomes and provide an IGO server with either detailed or general information related to each wagering transaction. And, in the case of live gaming, i.e. those games dealt by a live dealer, such as blackjack, the dealer or some other manual or automated system may determine the wager amounts as well as the game's outcomes and payouts into an intermediary device that is connected to the operator's table gaming accounting system which then provides either detailed or general information about each wager to a IGO server. As an example, if a player wagers $10 at a blackjack table and wins $15, the dealer or an image recognition system combined with a bet recognition system, enters wagers and the win amounts into a device connected to the casino's table game accounting system that tracks the wagers made at the table and, in turn, reports wagering activities to a IGO server. In another embodiment, the IGO server may receive the wagers and their results directly from an intermediary device that receives the player's digital wagers. In general, an IGO server interfaces with a casino's gaming systems to separately record information pertaining to wagers placed by users.

Access to an IGO server and its data could be via a private key or a combination of a public key and one or more private keys. The private keys maybe generated by the server and used as part of the encryption process. The data stored on an IGO server may be encrypted with one or more private keys that provide access to a particular record based on whether the record is related to a gaming or to a non-gaming transaction. As an example, if a casino patron registers with an IGO server and deposits $100 into his or her wallet/ account and places a number of wagers during a gaming session, and the patron's balance when leaving the game is $75, the patron's account will show the $100 deposit and a $25 loss during the gaming session, thus leaving a $75 balance. A casino operator or a regulator's access to the database on the other hand, will show all the gaming details of the player, such as the wagers and the related game outcomes, the ID of the game played etc., all time stamped on a chronological order.

One of the main benefits of using C3 is that an IGO server's distributed ledger keeps historical records that allow wagering activities to be tracked across all gaming products and platforms of one or more gaming operators. Another benefit of C3 is that players may use their C3 balances as a virtual currency inside or outside of an operator's resort property. Currently, casino revenues are determined on a game-by-game basis by adding up the net win amounts of each game. C3 allows an operator to calculate its revenues based on the result of all wagers by all patrons across different gaming channels and platforms. The strict regulatory oversight placed on gaming operators provides a level of trust to those who prefer to hold C3 as a virtual currency and use it in commerce to purchase goods and services from merchants or anyone who would accept C3 as a currency. One of the incentives for an entity to accept C3 is savings on charges imposed by banks and credit card providers. Another incentive to accept C3 is the trust placed on an IGO as a service provider and the confidence that one can always have the option to request the issuing operator or IGO to redeem a C3 for cash.

As the central repository source that maintains historical data related to wagers, the IGO server allows various entities, such as casino operators, LBSs or regulators, access to such information and run reports that are not readily available using prior art techniques. For example, a casino operator may request a gaming history of a particular player for a particular period of time across all its games and platforms. As another example, a net win report may be requested by an operator or a regulator for one or more gaming devices, such as one or more slot machines, over a set period of time to identify major deviations from the norm, to monitor a game's historical performance from the expected results and to determine whether the reported net wins is in line with the game's expected hold. With the history of all wagers and their outcomes being recorded on the IGO server, an operator can set up alerts and exception reports to identify unusual gaming activities. Access to the gaming related information and reports may be restricted to certain entities, such as operators and regulators, by assigning one or more private keys that allow such entities permission rights to read such information. However, a private key assigned to a player may only provide access to basic information, such as a C3 funds balance, loyalty points awarded, total wagers and win amounts.

Some of the differences between crypto currencies such, as Bitcoin, and C3 include data formation, distribution and transparency. Bitcoin is an unregulated currency mined by the processing power of computers. However, C3 is regulated and is issued as the result of a casino patron depositing cash into his or her regulated gaming account. All Bitcoin records are kept on a distributed network, while C3's primary records that include gaming-related transactional details are kept on centralized servers and may not include certain information, such as a user's C3 balances or information relating to non-gaming transactions, which are held on a distributed public network. The public network may merely maintain the records that relate to the balance of a C3 holder before and after a transaction. The primary purpose of centralized computing is to comply with gaming regulations and maintaining transparent records for those that have the permission rights to read and download any information related to a C3 account holder, such as the history of a C3 from issuance to redemption.

If a patron holding a C3 wallet decides to make a non-gaming transaction, for example makes a $30 purchase from merchant A who already has an account with an IGO server, the $30 transfer gets recorded as a non-gaming transaction and the patron's C3 balance is reduced by $30, while merchant A's balance is increased by $30. Similarly, if merchant A pays merchant B with C3 funds, the payment is recorded and time stamped as a non-gaming transaction on an IGO server, and the account balance of A is debited while the account balance of merchant B is credited. At any point of time, anyone that has C3 can request redemption, i.e., request legal tender in exchange for C3 currency or an alternative approved virtual currency, from an operator or an IGO server. With all C3 transactions being recorded in blocks, time stamped and maintained in a storage device or system, any transfer or redemption of C3 funds will be almost instant, as these transactions are not verified using a plurality of networked computers, such as in a Bitcoin network, thus creating a major advantage over a decentralized virtual currencies such as Bitcoin which requires verifications through solving complicated puzzles that could take some time to be verified.

In summary, C3 is a programmable fiat money i.e. a unit of currency such as a dollar, that may be associated with a single player, where gaming and non-gaming transactions involving C3 are recorded in private and public ledgers associated with an IGO. Using C3, the current labor-intensive practice of converting cash into chips at a table and converting chips back into cash at the casino's cage, as well as replacing TITO vouchers used in slot machines, is avoided. Use of C3 also allows interoperability between different gaming platforms, such as table games (such as poker, Blackjack, roulette, craps, etc.), on-site mechanical games (such as slot machines, video poker machines, etc.) and online gaming systems (such as online poker, craps, roulette, blackjack, etc.) of a casino, allowing players to purchase and redeem a crypto currency at a table game, a mechanical game, or online, as well as allowing non-gaming transactions. When making a wager on a casino game, a patron may use C3 to place wagers and receive payouts if the wagers result in wins. Embodiments of the invention comprise a method for players to deposit cash into a holding account maintained by a regulated IGO, together with a process and protocol for administering a digital wallet for wagering on a casino's table game, slot machine or on an online game. Due to C3's digital format, the system could allow an electronic token or image to be created and applied as a wager on a table game such as a blackjack. Similarly, a digital token can be transferred into slot machines or used in a casino resort's physical retail stores and restaurants.

The use of the term Casino Crypto Currency (C3) herein refers to a digital currency used by gaming operators and associated non-gaming merchants to allow wagering and non-gaming purchases. Each transaction between a user and a gaming operator or a non-gaming merchant is verified by a public, distributed network, i.e., using blockchain technology. However, details of wagering transactions are not exposed to the public blockchain. C3 may be "held" by users in a crypto wallet after purchasing C3 using traditional currency or credit.

Figure 5:
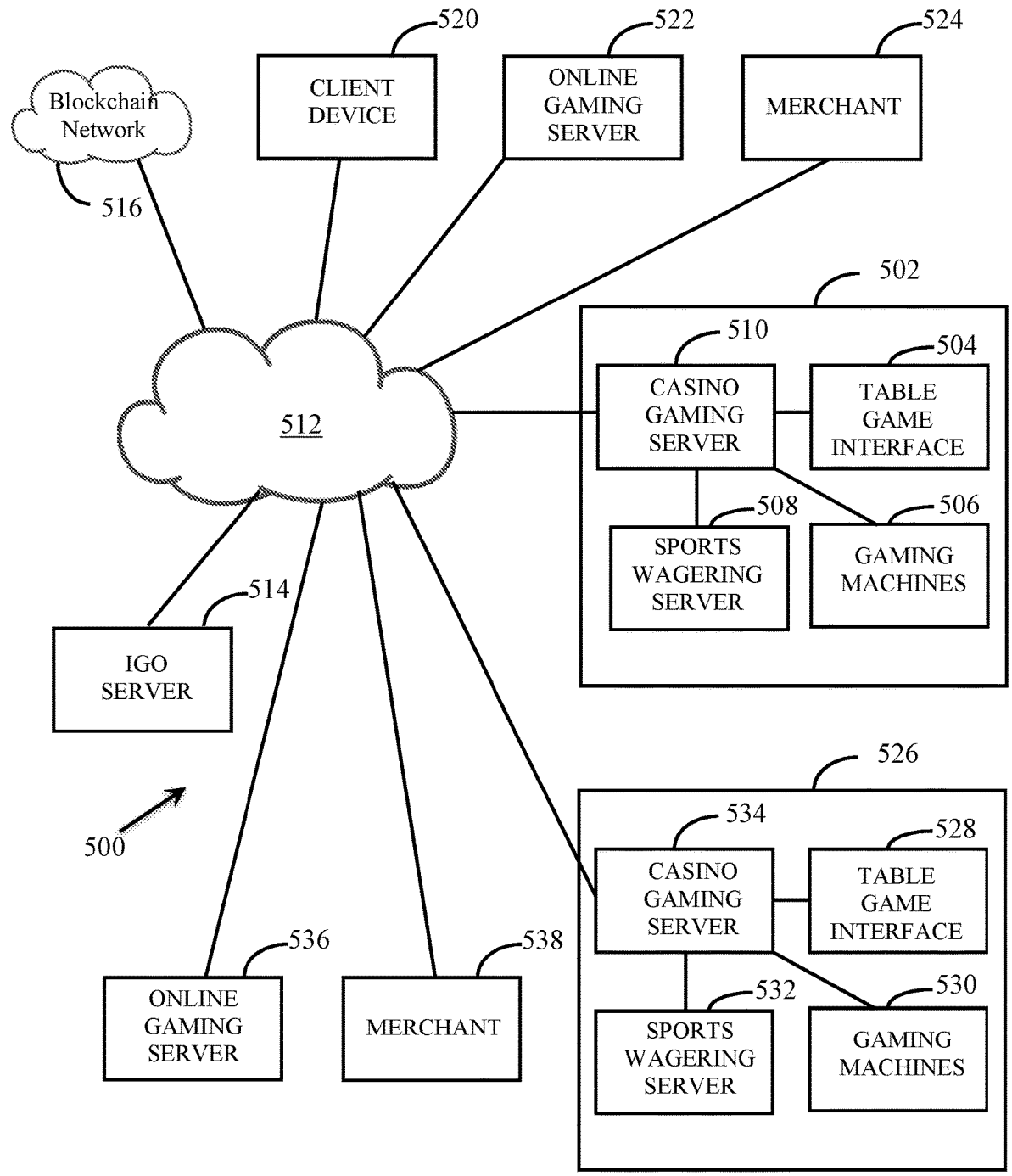
FIG. 5 illustrates one embodiment of a gaming network using C3.

FIG. 5 is an overall block diagram of a system 500 that uses C3 to allow gaming and non-gaming transactions. The system 500 comprises gaming operator systems 502 and 526, for example, casinos, that offers various gaming platforms to its patrons, such as table games via a table game interface 504/528, electronic gaming via gaming machines 506/530 and sports betting via a sports betting server 508/532. Each of the platforms may communicate with a respective casino gaming server 510/534 that manages some or all of the functionality of the various gaming platforms. Casino gaming servers 510/534 may also manage patron loyalty rewards as patrons place wagers on the various gaming platforms.

In this embodiment, both casino gaming server 510 and 534 are coupled to a wide-area network 512, such as the Internet, for communicating with an IGO server 514 and, in some embodiments, gaming operator system 502 comprises an online gaming server 522 and gaming operator system 526 comprises online gaming server 536. In other embodiments, a gaming operator system's online gaming platform is coupled directly to IGO server 514 via wide-area network 512. While only two gaming operator systems are shown in FIG. 5, it should be understood that in reality, multiple operator systems are present in system 500, each coupled to IGO server 514. Each online gaming server may additionally be associated with one or more merchants, such as hotels, spas, restaurants, bars, shops, etc. The merchants may be physically located on a gaming operator site, such as within a casino, or off-site. Each transaction platform of gaming operator system 502 (i.e., the table game interface, gaming machines, sports wagering server, online gaming or merchants) accepts a particular C3 that is only redeemable on one of the transaction platforms of gaming operator system 502, while each transaction platform of gaming operator system 526 accepts a different C3 that is only redeemable on one of the transaction platforms of gaming operator system 526.

IGO server 514 receives transaction information pertaining to gaming and non-gaming transactions from the transaction platforms of gaming operator systems 502 and 526. Upon receiving transaction information, IGO server 514 creates "crypto-blocks" for use in tracking transactions reported by the transaction platforms. The crypto-blocks are stored in blockchain network 516, which may comprise a commercially-available blockchain management system, such as an IBM Blockchain Platform provided by International Business Machines of Armonk, N.Y.

Client device 520 may be used to purchase and/or redeem C3, to play online wagering games conducted by online gaming server 522, or to participate in any of the table games, gaming machines, or sports wagering offered by gaming operator system 502 or 526. Client device 520 may comprise a smart phone, tablet computer, wearable device, or some other personal computing device, executing a software application that provides an interface to a user for conducting transactions with any of the transaction platforms.

Online gaming servers 522 and 536 may be owned and/or operated by gaming operator systems 502 and 526, respectively, and may be located outside of a premises of a gaming operator system, as shown, or in other embodiments, inside the premises of a gaming operator system. The online gaming servers may each offer online games such as blackjack, various forms of poker, electronic roulette, craps, slots, sports betting, and/or virtually any game that permits wagering to occur. Players may access the gaming servers via their client devices or via any computing device capable of network communications with the gaming servers.

Table gaming interface 504/528 comprises an electronic interface to one or more different casino wagering games, such as blackjack, craps, roulette, and poker. Such an electronic interface may comprise a wireless player interface, such as Bluetooth, for communicating with one or more players' client devices at one of the wagering games to receive wagers and to provide game outcomes and payouts. Players may interact with a wagering game using their client device 520, which may allow a player to wager a certain amount of C3 available to a player after the player has purchased C3 from a gaming system operator.

Gaming machines 506/530 may comprise any electronic wagering game, such as slots, video poker, video roulette, or any number of specialized electronic gaming machines, such as Wheel of Fortune®, Super Mystery Bingo, etc. The gaming machines may comprise a wireless player interface, such as Bluetooth, for communicating with a player's client device in order to receive wagers and to provide game payouts using a C3 particular to the gaming operator system where the gaming machine is located.

Sports wagering servers 508/532 comprise a computer server executing processor-executable instructions for providing sports-related wagering on a plurality of sporting events, such as football games, baseball games, horse racing, etc. Typically, a player accesses a sports wagering server via a player's client device, but in other embodiments, a gaming operator system may provide customized electronic interfaces on-site for allowing players to place wagers on various sporting activities. Wagers are placed using a player's C3 particular to the gaming operator system associated with the particular sports wagering server.

In any of the above examples, each time that a wager is placed, or an outcome is determined, at a table game interface, a gaming machine, or via a sports wagering server, transaction information is generated and provided to casino gaming server 510/534. The transaction information is used by various systems of a gaming operator to track wagering, such as an accounting system that tracks player account balances of C3, a database system for storing historical gaming information for gaming regulators, and a player rewards system that provides players with rewards to players for prolonged game play at a particular gaming operator site. The transaction information is also forwarded to IGO server 514 by casino gaming server 510/534.

Figure 6:
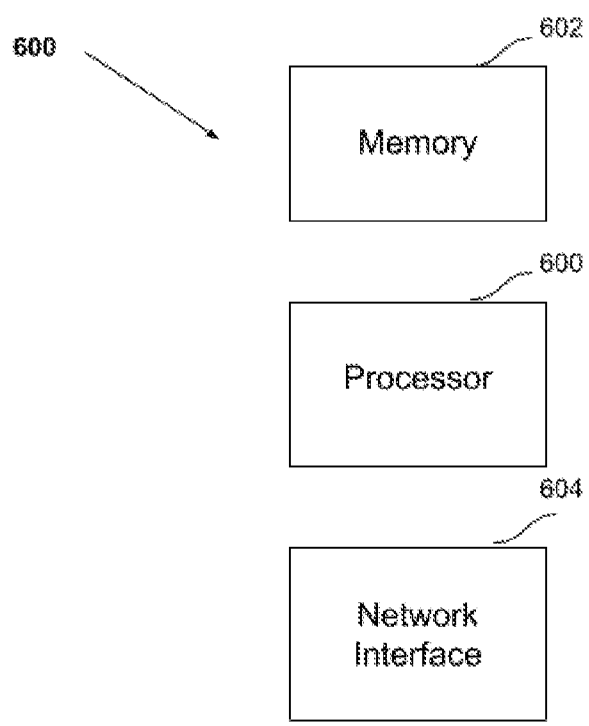
FIG. 6 illustrates a functional block diagram of one embodiment of a gaming sever used in the gaming network of FIG. 5.

FIG. 6 illustrates a functional block diagram of one embodiment of IGO server 514. Specifically, FIG. 6 shows processor 600, memory 602, and network interface 604. It should be understood that the functional blocks shown in FIG. 6 may be connected to each other in a variety of ways, and for purposes of clarity, not all functional blocks necessary for operation of IGO 514 are shown (such as a power supply). Processor 600 is configured to provide general operation of IGO 514 by executing processor-executable instructions stored in memory 602, for example, executable code. Processor 600 is typically a general-purpose processor, such as any one of a number of Pentium® class microprocessors manufactured by Intel Corporation of Santa Clara, Calif. Memory 602 comprises one or more information storage devices, such as RAM, ROM, flash memory, or virtually any other type of memory device. Memory 602 is used to store the processor-executable instructions for operation of IGO 514 as well as any information used by processor 600, such cryptographic keys for creating and deciphering crypto-blocks, user account information, gaming operator account information, and merchant account information.

Figure 7:
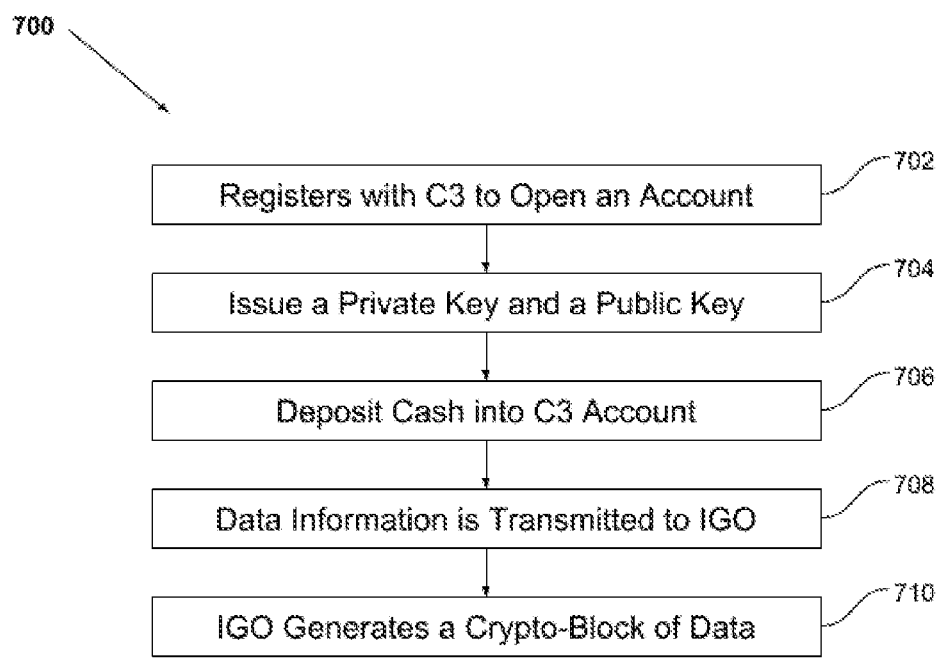
FIG. 7 is a flow diagram illustrating one embodiment of a method for a user opening a C3 account with an IGO for placing wagers on games, sporting events and make non-gaming purchases.

FIG. 7 represents an embodiment of a registration and login process by a user to open an account with IGO 514. At 702 a user registers with IGO 514 at physical location of an operator gaming system, or at some other designated physical location. Depending on the rules and regulations of the jurisdiction, the user might have to be physically present at the time of sign up and be required to show proof of ID such as driver's license or passport. In one embodiment, IGO 414 creates a primary account and associates one or more sub-accounts with the primary account, each sub-account associated with a particular gaming operator system that uses a particular C3, in one embodiment, different than other gaming operator systems. Generally, IGO server 514 stores a username and password provided by the user as login credentials for subsequent access to the user's account(s).

At 704, IGO 514 may issue a private encryption key and a public encryption key to the user for later use by the user to decrypt past transaction information that has been received and encrypted by IGO server 514 using the user's public key. The public key may be stored in memory 602 by processor 600.

At 706, the user funds the account(s), either while at the designated place for opening a new account as described above (or at some other time), or online via the user's client device 520. In either case, the user provides funds in the form of currency to a gaming operator and, in exchange, the gaming operator issues an amount of C3 to the user in accordance with an exchange rate set by the gaming operator. The casino gaming server 510/534 may perform this transaction, or some other server associated with the gaming operator.

At 708, information related to the transaction is provided to IGO server 514 via wide-area network 512 as transaction information. The transaction information typically comprises at least a user Id that identifies the user, such as a driver's license number, social security number, etc., that was previously verified by the gaming operator during the account setup process, a gaming operator ID that identifies a particular gaming operator, i.e., casino, that has provided C3 to the user, a transaction type, such as "deposit" or "withdrawal", and a transaction amount equal to the amount of currency deposited or withdrawn.

At 710, the IGO server 514 receives the transaction amount, and in response, generates a crypto-block from the transaction information and, in one embodiment, a cryptographic key associated with the user.

Figure 8:
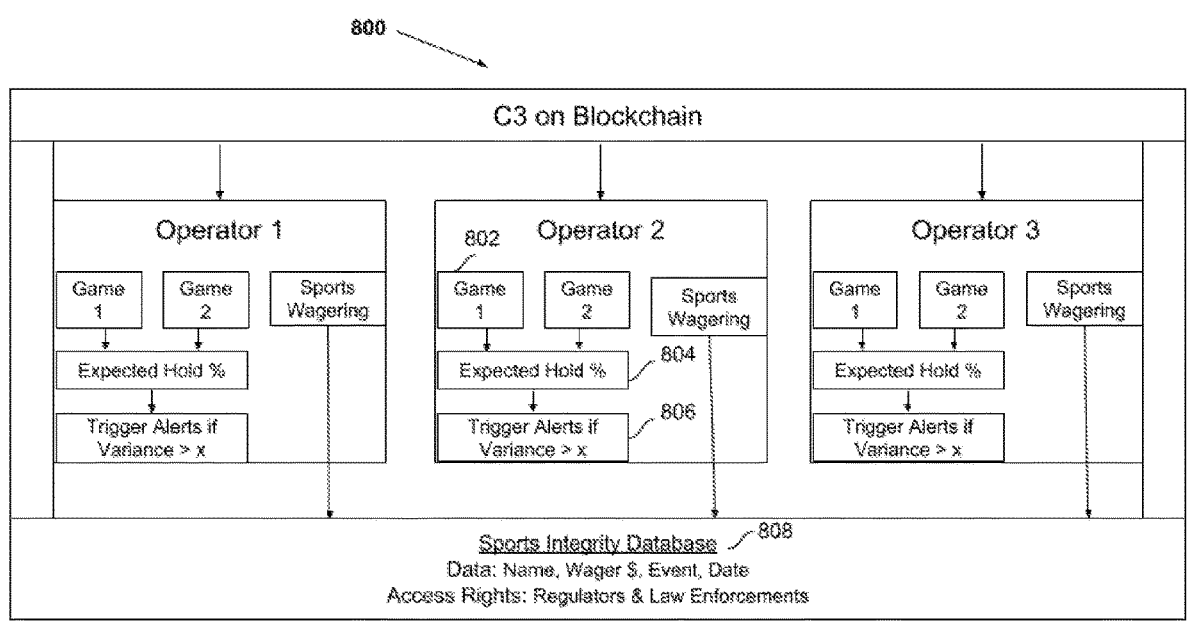
FIG. 8 illustrates one embodiment of a method for setting up automatic alerts for a game when its results and outcomes exceeds certain results.

FIG. 8 illustrates one embodiment of a method used by a gaming operator to set up automatic alerts 806 based on expected hold percentages 804 for games 802 offered by gaming operators, such as table games, slots, sports wagering and online games. IGO server 514 tracks and records each wager by creating crypto-blocks and storing the crypto-blocks on blockchain network 516, enabling gaming operators to create gaming-related reports and alerts. Block 800 of FIG. 8 illustrates a process for a gaming operator 502/526 to use the data stored on blockchain 516 for sending automatic alerts 806 to its casino managers concerning an unusual activity such as game hold percentage 802 deviating from an expected hold percentage 804 for table games managed by table game interface 504/528, or electronic games, by a predetermined percentage established by the operator or a regulator. The alert could be based on the historical results of a game or the historical play of one or more players for a period of time. As an example, if the hold percentage of a blackjack table or a slot machine is substantially below the expected hold percentage and the anomaly is traced to be associated with a high win by a player, the variance may suggest collusion, fraud or a malfunction.

FIG. 9 represents an embodiment of an IGO crypto-block structure and the permission rights associated with various persons and entities. The Database 902 includes encrypted data with one or more hash keys for data records for each player and wager's history such as Player ID, Player's C3 balance time stamped, the ID of the games played by the player, the wagers made by the player time stamped, game outcome e.g. win or loss, the win and loss amount for each game session, loyalty point balance time stamped, loyalty points awarded for each wager, non-gaming merchant ID and C3 transfers to non-gaming merchants. Access to each record is in accordance with pre-assigned Permission Rights 904, for example, each player is given the rights to access his or her C3 balance, win or loss for a gaming session, loyalty points balance and loyalty points awarded for each gaming session as well as C3 transfers made to a non-gaming merchant for purchase of goods and services. It should be noted that the data kept on blockchain 516 is archived according to regulators and statutory data retention requirements. As an example, a player may use his private key and a smartphone that has a C3 gaming app to access the player's encrypted data on blockchain network 516 to get information on his C3 balance or to make a purchase from a merchant that is authorized to accept a particular C3 currency. Using a computer that is connected to IGO 514 and a private key, the operator or a regulator gets full access to all crypto-blocks stored on blockchain network 516 and detailed reports about the activities of each player.

Figure 10:
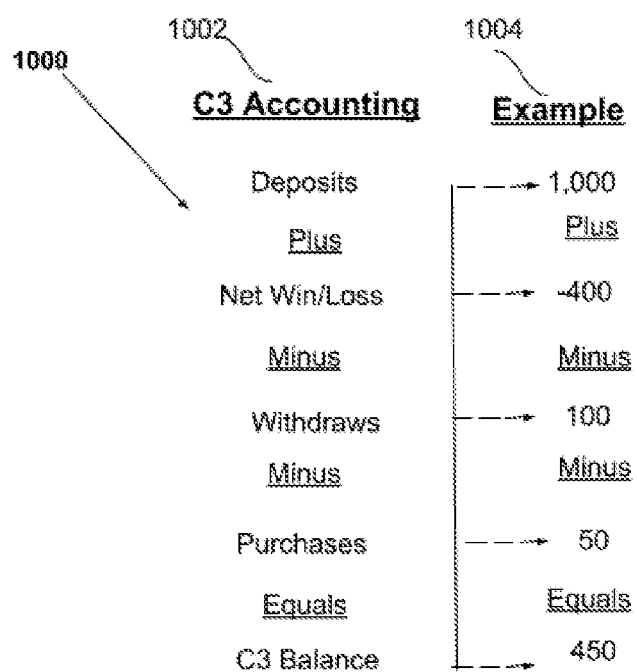
FIG. 10 presents an illustration and an example for C3 as illustrated in FIG. 5 for record keeping proposes between various stakeholders.

FIG. 10 illustrates one embodiment of Accounting 1002, a process for associating deposits made by a player to a gaming operator, and wagers made by the player using client device 520. At 1004, the player uses his client device 520 that has a C3 gaming app that shows 1000 C3 Units. The player approaches a slot machine and connects to the slot machine with client device 520 using NFC, Bluetooth, or some other near-field wireless technology, to place a $10 wager at the machine or may make a C3 transfer to the machine's meters prior to commencing a gaming session at the machine. At any point of time, a player's C3 balance maybe associated to a deposit by the player or a credit such as a gaming win. The association may be done using various methods such LIFO (Last In First Out) or FIFO (First In First Out). Regardless of which methodology is used, it is important it is used consistently throughout the process of storing and retrieving the C3 data, which is time stamped upon creation of crypto-blocks by IGO 514.

At example 1004, if a player makes three deposits to his C3 account, one for $200, followed by a $500 and then a $300 to give him a balance of 1,000 in C3 Units before playing twenty rounds of play at the slot machine, and at the time he quits the game his loss during the session was 400, which was then followed by a $100 withdrawal at the casino's cage and a transfer of 50 in C3 Units to a merchant that accepts the particular C3 in the player's account, then the player's C3 balance after all these transactions is reduced by 550 Units from 1,000 to 450. The player's remaining 450 C3 Units may get associated on a LIFO basis to his three deposits and his net win or loss. In Example 1004, the 450 C3 balance represents the last $300 deposit made by the player plus $150 out the $500 deposit made prior to the last deposit. The 50 C3 Units, the 100 withdrawal and 200 of the gaming loss get associated with the $500 deposit and the remaining 200 gaming loss gets associated with the initial $200 deposit. The player's app will give the player access to the crypto-blocks that are pertinent to the player's game session with the slot machine and his non-gaming activities, i.e. the C3 balance of 1000 before starting the game, the net loss of 400 when leaving the game, the 100 Units withdrawal and the 50 Units transfer to the merchant for a purchase. However, the operator or the regulator can access all the data and records of the player, such as the amount of each wager, the game ID, the results of each wager, etc. all time stamped. Since the IGO server 514 associates each wager to a player's deposit or a net win, the present invention enables a casino operator to have full access to all its gaming activities and provides a more comprehensive "net win" calculation than the current systems available to the industry such as slot accounting systems, which track the net win on a slot-by-slot basis by deducting total wagers less total payouts. Similarly, it can replace the net win calculation for table games, which is done on table-by-table basis for each shift based on net change in chips inventory adjusted for drops, fills and markers, etc.

Figure 11:
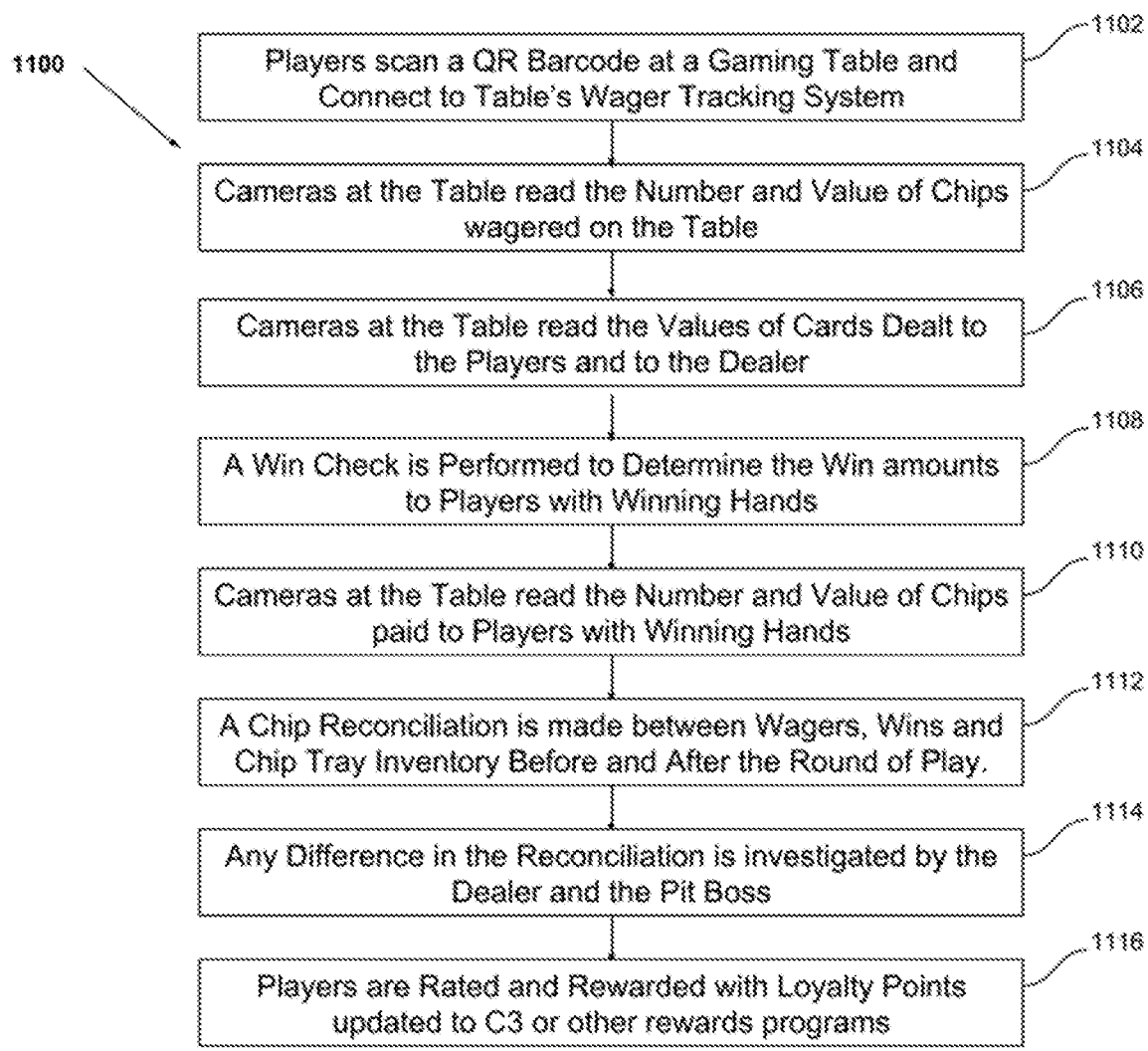
FIG. 11 is a flow diagram illustrating an embodiment of a gaming table with cameras recognizing the value of chips and value of cards dealt at the table as well as rewarding and rating players at the table.

FIG. 11 is an illustration of an embodiment of a table game where a player makes a wager using traditional casino chips. At 1102, the player might use his or her client device 520 to scan a QR barcode or go to a website or an App to connect to table game interface 504 associated with a particular table game, such as blackjack. At 1104, cameras read the number and denomination of the chips wagered by each player at the table. At 1106, cameras read the number and value of cards dealt to the players and the dealer. At 1108, a win check is performed to determine the win amounts to be paid to each player who have a winning or push hand. At 1110, cameras at the table read the value of the chips paid to each player with a winning or push hand. At 1112, the table game interface 504 performs a reconciliation between the total value of the chips in the chip tray before the round of play started, the total wagers made at the table, the total win amounts paid to the players with winning hands as well as the ending inventory of the chip tray after the round of play is finished. At 1114, any difference in the reconciliation is reported and investigated by the dealer or the pit boss, and at 1116, table game interface 504 rewards players with loyalty points according to the bets they made which may be reported to IGO 514 and stored as a crypto-block on blockchain network 516 or other loyalty rewards system. The system may also rate the player based on wagers and win amounts, which may be recorded in IGO server 514 and may only be visible to the gaming operator.

Figure 12:
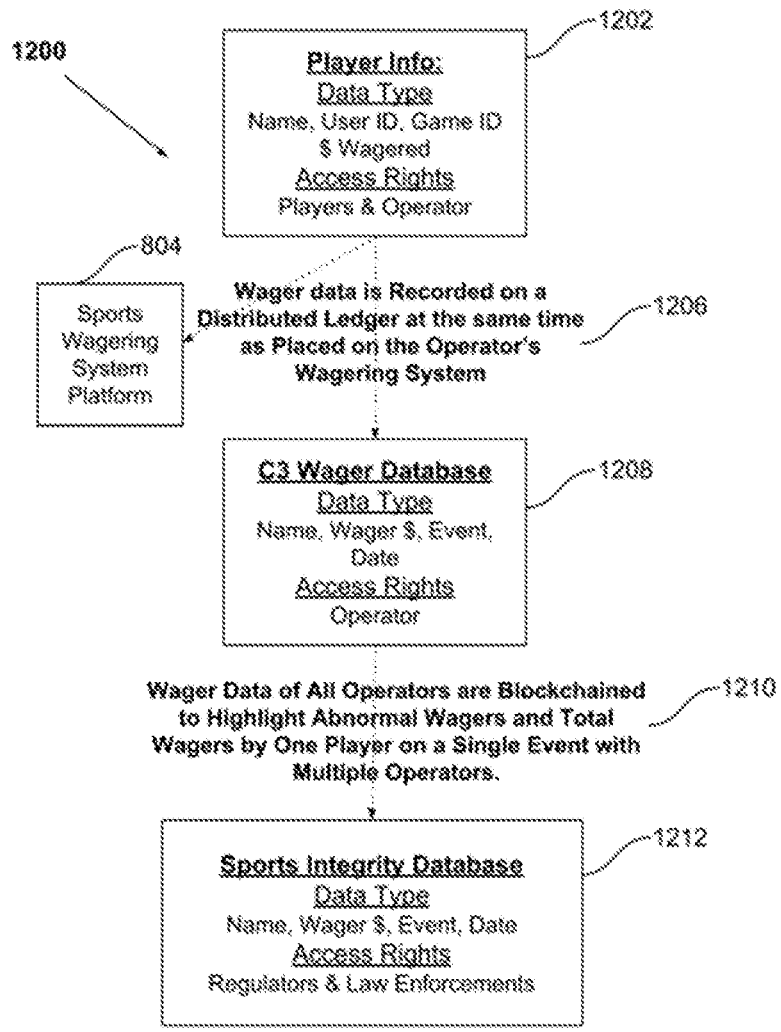
FIG. 12 is an illustration of an embodiment for sports wagering operators to enter into IGO's C3 database large and suspicious wagers and criteria to alert regulators and law enforcement agencies.

FIG. 12 is one embodiment of a sports wagering integrity database architecture whereby sportsbook operators enter or upload large or suspicious wagers into IGO server 514. At 1202, a gaming operator provides details of a wager placed by a player, such as the player's ID, the wager amount and the gaming operator ID, and a game or event ID that identifies the particular sporting event that was wagered on. In another embodiment, the player uses a C3 wallet to place a wager on sports wagering server 510, which is recorded by IGO server 514 as shown in step 1206. Step 1208 highlights the type of data that is stored on the blockchain network 516 by IGO server 514, which includes at minimum the following information: Player ID, Event ID, Event date, $ amount wagered, etc. Such data is only made available to the gaming operator that player used to place his wager. At 1210, wager data from all gaming operators are compared to highlight abnormal wagers such as identifying players who wager large amounts with different operators for the same event or wagers on both sides of an event or a pattern of such wagers by different players that might be colluding with each other.

Figure 13A:
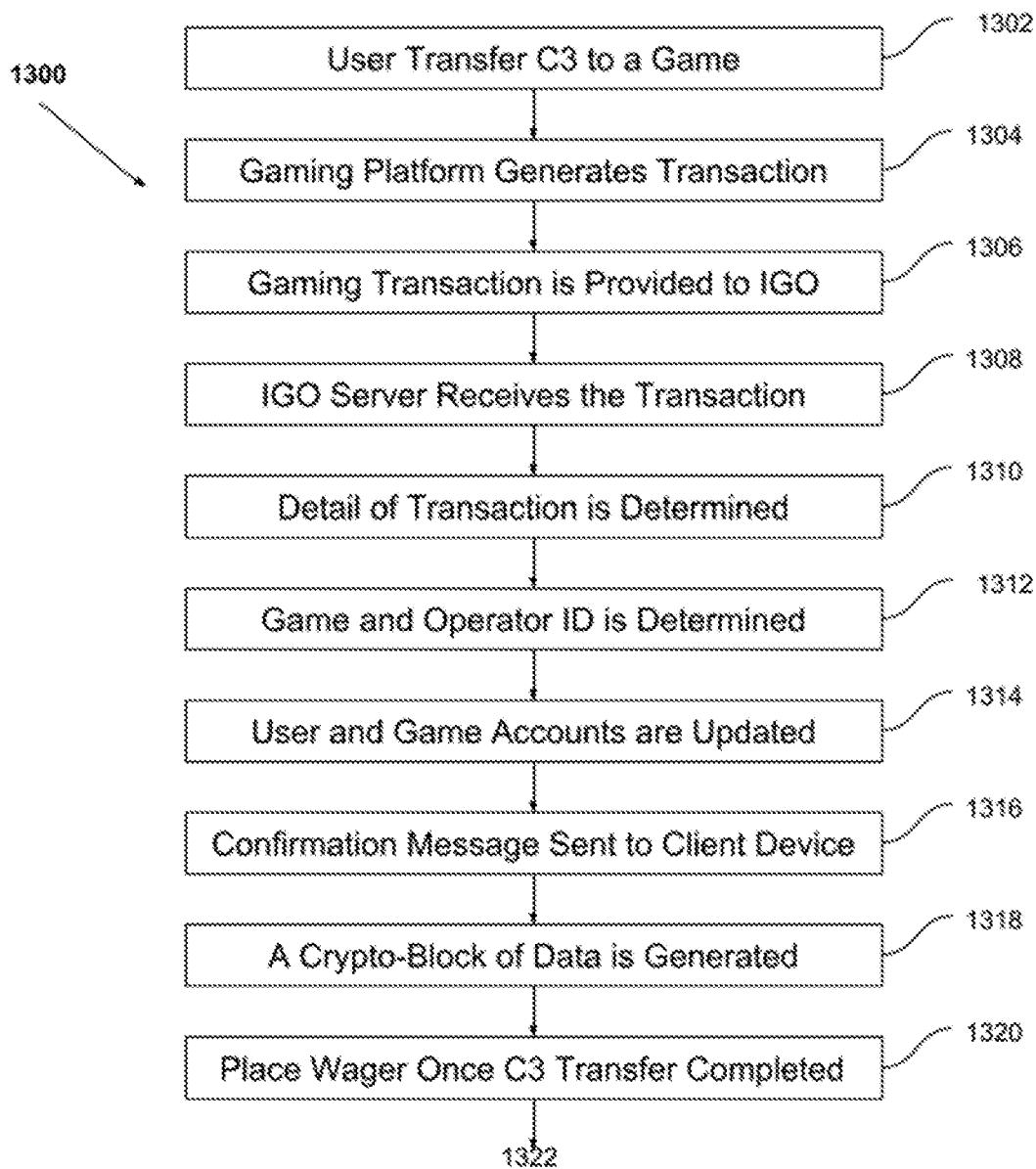
FIGS. 13A, 13B, and 13C are a flow diagram of one embodiment of a method, performed by the IGO server as shown in FIGS. 5 and 6, to manage transactions that occur on platforms owned or operated by different gaming operator systems.
Figure 13B:
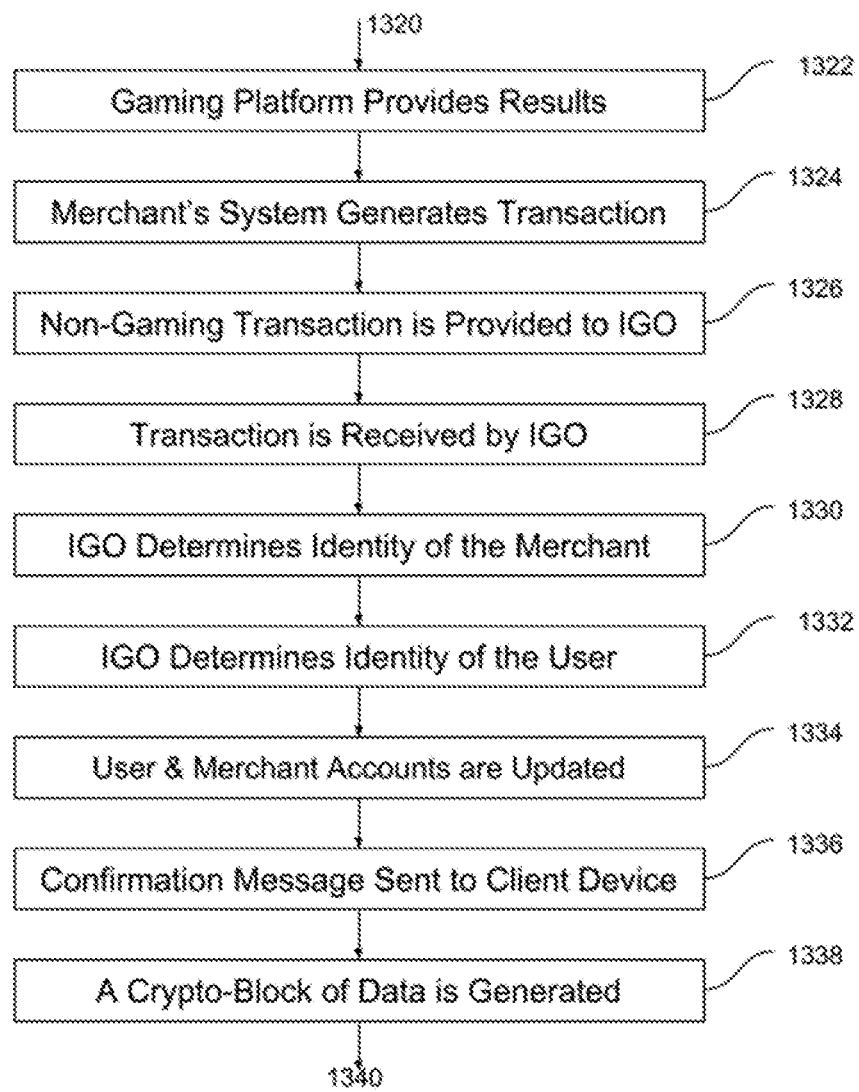
Figure 13C:
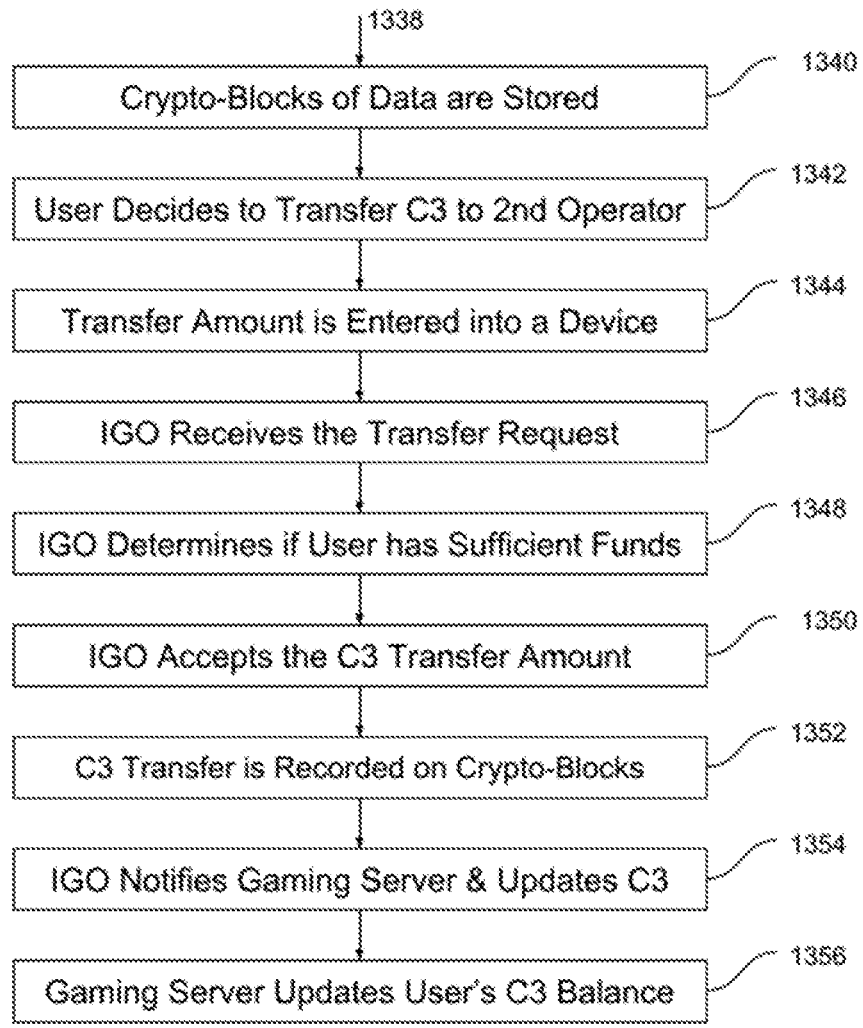

FIGS. 13A, 13B, and 13C are a flow diagram of one embodiment of a method, performed by IGO server 514, to manage transactions that occur on platforms owned or operated by different gaming operator systems. It is assumed that a person has already opened a primary account with IGO server 514, the primary account comprising at least two sub-accounts, each sub-account associated with a particular gaming operator system and a respective C3. It is also assumed that the person has funded at least one of the sub-accounts, i.e., has provided real or electronic currency to a gaming system operator in exchange for a certain amount of the gaming system operator's C3. It should be understood that the steps described in this method could be performed in an order other than what is shown and discussed, and that some minor steps may have been omitted.

At block 1300, the person may desire to place a wager on a particular gaming platform belonging to a first gaming operator system 502 associated with a first sub-account managed by IGO server 514. The gaming platform may comprise a table game, such as poker, craps, roulette, blackjack, etc. that interfaces with casino gaming server 510 via table game interface 504, a gaming machine 506, a sports wagering platform utilizing sports wagering server 508, or an online platform that utilizes online gaming server 522. In any case, the person launches a software application resident on the person's client device 520 that provides a wagering interface to any of the aforementioned gaming platforms, as well as a non-wagering interface to purchase goods or services associated with the first gaming operator system 502, i.e., accepts a first C3 issued by first gaming operator system 502 as a result of the person providing currency to a first gaming system operator associated with first gaming operator system 502.

At block 1302, the person may choose how much C3 to transfer to the table game interface 504, gaming machine 506 or sports wagering server 508 to fund one or more wagers, and provide an indication to one of the gaming platforms of such a C3 transfer by simply bringing client device 520 in proximity to a gaming platform, or some other electronic gaming terminal associated with one of the platforms. The transfer amount, as well as other information, such as a user ID or account number that uniquely identifies the person, is received by one of the platforms using techniques well known in the art, such as via wireless communication technology or scanning techniques.

At block 1304, the particular gaming platform generates gaming transaction information for recording the C3 transfer by IGO server 514, as well as, in some embodiments, casino gaming server 510. The gaming transaction information may comprise one or more of the user ID, the C3 transfer amount, an indication of the type of C3 used (i.e., C3 associated with gaming operator system 502, 526, etc.), an indication whether the amount is a debit or a credit, a transaction type (i.e., account funding, transfer, wager, wager outcome, gaming transaction, nongaming transaction, etc.), a merchant/gaming operator ID that identifies a gaming operator associated with the gaming transaction, and a game or event ID that identifies a particular gaming table, gaming machine, or sports wagering server that received the C3 transfer. The game/event ID may additionally comprise a game type (i.e., blackjack, craps, video poker). The gaming transaction information may also comprise a date and a time that the C3 transfer instruction was received.

At block 1306, the gaming transaction information is provided to IGO server 514, to casino gaming server 510, or both. In the case that the gaming transaction information is provided only to casino gaming server 510, casino gaming server 510 forwards the gaming transaction information, or at least some of the information in the gaming transaction information, to IGO server 514.

At block 1308, IGO server 514 receives the gaming transaction information via network interface 604 and provides the gaming transaction information to processor 600.

At block 1310, processor 600 determines an account that the gaming transaction information is associated with. Processor 600 typically determines this by evaluating the user ID found in the gaming transaction information and comparing the user ID to a plurality of user IDs stored in memory 602 to identify an account number belonging to the person.

At block 1312, processor 600 identifies a sub-account associated with the person associated with the gaming transaction information by evaluating the type of C3 identified in the gaming transaction information, or by evaluating a merchant/gaming operator ID in the gaming transaction information.

At block 1314, processor 600 debits or credits the sub-account associated with the type of C3 in the gaming transaction information. In this example, a balance associated with a first sub-account is debited an amount equal to the transaction amount in the gaming transaction information.

At block 1316, processor 600 may generate and send a confirmation message directly to the client device 520, indicating that the person's account balance associated with the first sub-account has been reduced by the transaction amount.

At block 1318, processor 600 may generate at least one crypto-block from at least some of the gaming transaction information. Because this crypto-block(s) are accessible to the person who placed a wager, not all of the information in the transaction information is encrypted and stored in the crypto-block. For example, the transaction information for a wager may include things like an identification of a gaming table or machine, a payoff percentage, or some other information that might be useful to a gaming operator, but undesirable for a person to view. Thus, only a portion of the transaction information for a gaming-related transaction may be stored in a crypto-block. The crypto-block comprises the portion of data from the transaction information, cryptographically-encoded using a cryptographic key associated with the person. The cryptographic key may comprise a public, or private, cryptographic key that is assigned by processor 600 to the person during account setup and stored within memory 602 in association with the person or the person's account and/or sub-accounts. In one embodiment, a public key and associated private key is generated by processor 600, and then the public key is provided to the person, while the private key is stored in memory 602 in association with the user. The private key is then used by processor 600 to generate crypto-blocks accessible to the person, but not accessible to any gaming operator or even to gaming regulators.

In one embodiment, different portions of the transaction information are stored in a crypto-block, depending on whether the transaction comprises a wagering transaction vs. a non-wagering transaction. For example, when processor 600 determines that transaction information comprises information related to a wager, processor 600 may encrypt only some of the transaction information, such as user ID, gamy type, wager amount, game result, and payoff result. Other information, such as a gaming operator ID, platform ID, or payout statistics, may not be included in the crypto-block, because the person who placed the wager has no use for such information. When processor 600 determines that a non-wagering transaction has occurred, processor 600 may encrypt different portions, or all of the transaction information.

In one embodiment, three different crypto-blocks are generated for each gaming transaction information received. Each of the three crypto-blocks are generated using a different cryptographic key, and each key is associated with a respective person or entity. For example, in this embodiment, processor 600 generates a first crypto-block associated with the person who initiated the gaming transaction, as described above. A second crypto-block is generated using a second key pair associated with a particular merchant or gaming operator as identified in the wagering transaction information, i.e., via the merchant/gaming operator ID. Here, in on embodiment, processor 600 generates a public key and a private key for a particular gaming operator or merchant, and the public key is provided to the gaming operator/merchant, while the private key is stored in memory 602 in association with the particular gaming operator/merchant. This key generation may occur during an account setup process for the merchant/gaming operator. The second crypto-block is generated by encrypting another portion, or all, of the transaction information using the gaming operator/merchant's private key, which may include data not meant to be viewed by the person who placed the wager. A third crypto-block is similarly generated using a third key pair associated with a gaming regulator, where all of the information in the transaction information is encrypted using the regulator's private key. The person may access any crypto-blocks generated by IGO server 514 and associated with the person by providing the person's public key to IGO server 514 at a later time using the software application on the person's client device 520. A merchant, or gaming operator, may access and decrypt any crypto-blocks that were generated by IGO server 514 and associated with a particular merchant or gaming operator by providing the gaming operator/merchant's public key to IGO server 514. The gaming regulator may access and decrypt any crypto-blocks generated by IGO server 514 and associated with the gaming regulator by providing the gaming regulator's reciprocal key to IGO server 514 at some later time (the gaming regulator's key pair generated during an account setup process for the gaming regulator, similar to the setup described to create an account for a merchant or gaming operator).

At block 1318, processor 600 provides the one or more crypto-blocks to network interface 604 for storing the block(s) on blockchain network 516. In another embodiment where three crypto-blocks are generated as described above, each crypto block is stored in memory 602 in association with the person or entity to which the crypto block was generated for. For example, the first crypto-block described above would be stored in memory 602 in association with the person, person's account, or person's sub-account associated with the gaming transaction information. The second crypto-block would be stored in memory 602 in association with the merchant or gaming operator identified in the gaming transaction information. The third crypto-block would be stored in memory 602 in association with the gaming regulator.

At block 1320, after the person has transferred an amount of C3 particular to a gaming operator system to a particular gaming platform, the person may place a wager using the gaming platform itself, i.e., place a wager at a blackjack table, place a wager using a slot machine user interface, place a wager using a video poker user interface, etc., or otherwise placing a wager via the software application running on the person's client device.

At block 1322, the gaming platform generates wagering transaction information indicative of the wager that was placed, i.e., comprising a wager amount (in the particular C3 that is valid on the gaming platform), In either case the wagering transaction information at this block comprises some or all of the information described above with respect the wagering transaction information during transfer of C3 from the person to the gaming platform. The wagering transaction information is sent to IGO server 514 and processed as described above, debiting or crediting a sub-account of the person, and generating one or more crypto-blocks.

At block 1322, a wager result is determined, either by the gaming platform or casino gaming server 510, i.e., whether the wager placed by the person was successful, depending on an outcome of a particular game. In response, the gaming platform generates wagering transaction information, comprising one or more of an identification that the transaction comprises a wager result, a wager result (i.e., win or loss), a payout amount (if a win), and other information described earlier herein with respect to wagering transaction information. The wagering transaction information is sent to IGO server 514 and processed as described above, debiting or crediting a sub-account of the person, and generating one or more crypto-blocks.

At block 1324, the person may wish to conduct a non-wagering transaction with a merchant associated with gaming operator system 502, i.e., one that accepts the same C3 that was issued by the gaming operator associated with gaming operator system 502, such as a hotel, restaurant, spa or shop associated with the gaming operator. The person uses the software application running on the person's client device 520 to pay for the non-gaming transaction, and an electronic payment system or POS associated with merchant 524 receives an indication of payment in C3 from the person via the client device 520.

At block 1324, the payment system of merchant 524 generates non-gaming transaction information, comprising much of the same information as the gaming information generated in response to gaming transactions, described above. The non-gaming transaction information may indicate that the transaction is a non-gaming, or merchant, transaction, and include a description of the goods and services purchased by the person.

At block 1326, the non-gaming transaction information is provided to IGO server 514 via wide-area network 512.

At block 1328, the non-gaming transaction information is received by IGO server 514 via network interface 604 and provided to processor 600.

At block 1330, processor 600 determines an account that the non-gaming transaction information is associated with. Processor 600 typically determines this by evaluating the user ID found in the non-gaming transaction information and comparing the user ID to a plurality of user IDs stored in memory 602 to identify an account belonging to the person.

At block 1332, processor 600 identifies a sub-account associated with the person associated with the non-gaming transaction information by evaluating the type of C3 identified in the non-gaming transaction information, or by evaluating a merchant/gaming operator ID in the non-gaming transaction information.

At block 1334, processor 600 debits or credits the sub-account associated with the type of C3 in the non-gaming transaction information. In this example, a balance associated with the first sub-account is debited an amount equal to the transaction amount in the non-gaming transaction information.

At block 1336, processor 600 may generate and send a confirmation message directly to the client device 520, indicating that the person's account balance associated with the first sub-account has been reduced by the transaction amount.

At block 1338, processor 600 may generate at least one crypto-block from the non-gaming transaction information, similar to the process of creating a crypto-block as described above with respect to a gaming transaction.

In one embodiment, processor 600 determines that the non-gaming transaction information involves a non-gaming transaction and, in response, generates a crypto-block for the person, and a crypto-block for use by the merchant who participated in the transaction. Processor 600 does not create a gaming regulator crypto-block, because a gaming regulator should have no authority to oversee non-gaming transactions.

At block 1340, processor 600 stores the crypto-block(s) either in a blockchain network 516, or memory 602. In one embodiment, crypto-blocks associated with the person are stored in association with the person's account or sub-account, while crypto-blocks associated with the merchant are stored in association with the merchant.

At block 1342, the person may wish to transfer a first C3 that was originally purchased as described above, to a second gaming operator system 526 that uses a second form of C3. For example, the person may wish to transfer $100 worth of MGM casino operator's C3 that was issued to the person previously to Harrah's casino operator that uses a different form of C3 incompatible with the C3 from MGM. The person may access a portion of the software application running on the person's client device 520 to view available balances in each account or sub-account that the person opened previously. In this example, the person previously opened a main account having two sub-accounts, one that references all gaming and non-gaming transactions associated with MGM, and another sub-account that references all gaming and non-gaming transactions associated with Harrah's. Further, in this example, the balance in the MGM account is $100 worth of MGM C3, and the balance in the Harrah's account is $0 worth of Harrah's C3.

At block 1344, the person utilizes a user interface provided by the software application to enter a transfer amount, a sub-account to transfer from, and a sub-account to transfer to.

At block 1344, the client device 520 sends a transfer request to IGO server 514 via wide-area network 512, the transfer request comprising a user ID of the person, a transfer amount (either in currency or C3 amounts), the transfer-from sub-account, and the transfer-to sub-account. Note that the transfer request is sent to IGO server 514 and not to casino gaming server 510 (i.e., MGM's gaming server) or to Harrah's gaming server 534, as the two gaming operators reconcile their accounts with each other at predetermined time periods, such as once per month.

At block 1346, IGO server 514 receives the transfer request via network interface 604 and provides the transfer request to processor 600.

At block 1348, processor 600 identifies the transfer-from sub-account and determines whether there are sufficient funds available in sub-account (associated with MGM in this example) to transfer to the sub-account associated with Harrah's.

At block 1350, when processor 600 determines that there are enough funds, processor 600 debits the MGM sub-account by the transfer amount and credits the Harrah's sub-account with transfer amount. Note that in terms of C3, a different amount of C3 may be debited from the MGM sub-account than credited to the Harrah's sub-account, due to potential exchange rates offered by MGM vs. Harrah's.

At block 1352, processor 600 generates one or more crypto-blocks detailing the transfer (such as user ID, transfer-from sub-account, transfer-to sub-account, date of transaction, time of transaction, etc.), in one embodiment using the person's cryptographic key that was provided to the person during the setup process, and stores the one or more crypto-blocks either on blockchain network 516 or in memory 602 in association with the person's account or sub account(s). In another embodiment, one or more crypto-blocks are generated by processor 600 using the person's cryptographic key, another one or more crypto-blocks are generated by processor 600 using a cryptographic key provided to gaming operator system 510 (i.e., MGM), another one or more crypto-blocks are generated by processor 600 using a cryptographic key provided to gaming operator system 526 (i.e., Harrah's), and another one or more crypto-blocks using a cryptographic key provided to the gaming regulator. Each of these crypto-blocks may be stored on blockchain network 516 or in memory 602 in association with the person and each respective entity.

At block 1354, after the amount has been transferred, IGO server 514 sends a notification to casino gaming server 510 indicating that the person's balance has been reduced by the transfer amount.

At block 1356, IGO server 514 sends a notification to casino gaming server 534 indicating that the person's balance has been increased by the transfer amount.

In this way, use of IGO server 514 allows convenient transfers of C3 between different gaming operators, while transactions involving the transfer of currency to a person's sub-accounts is performed by gaming operators, who generally have the necessary authority to conduct such transactions.

Figure 14:
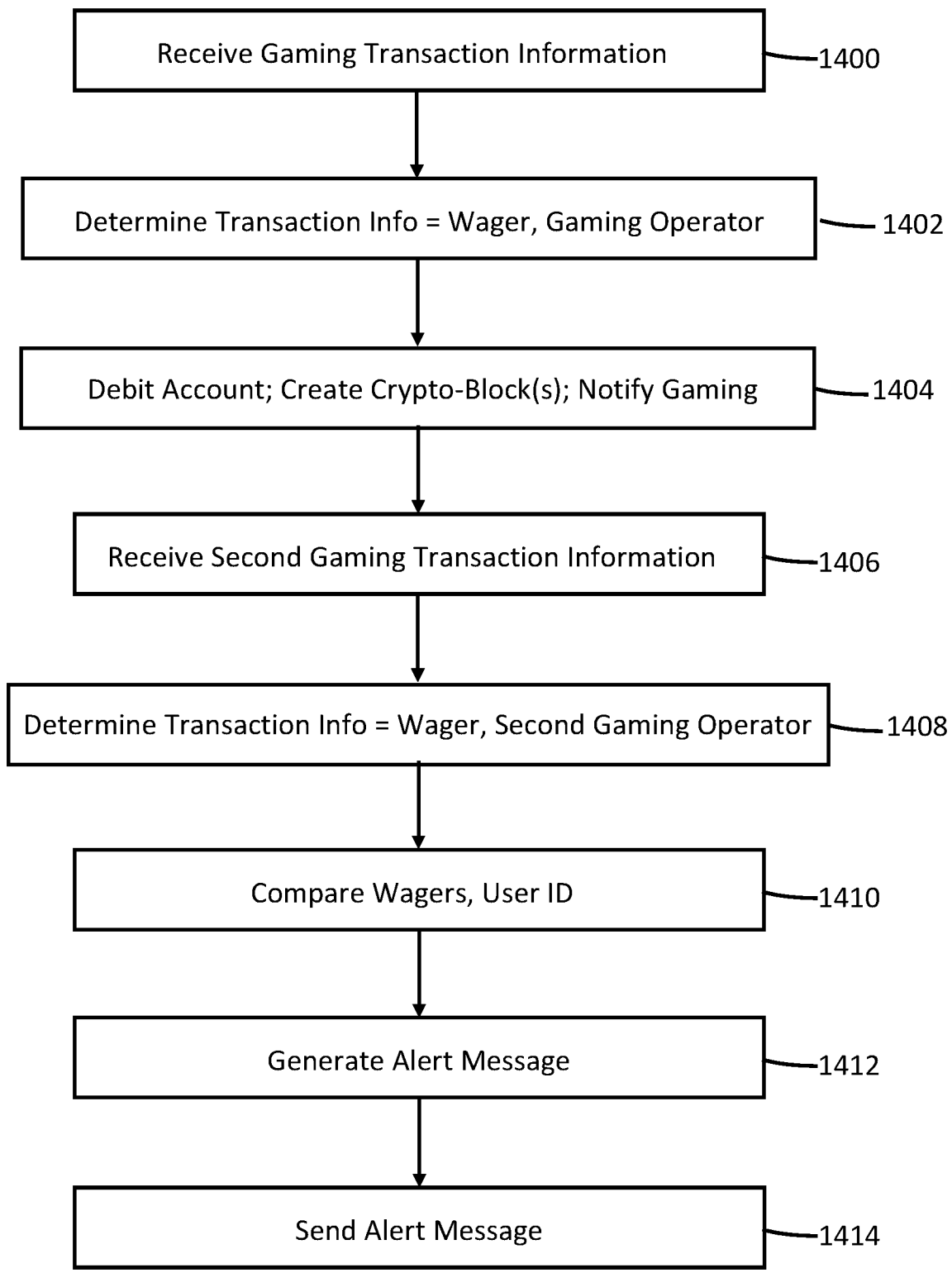
FIG. 14 is a flow diagram illustrating one embodiment of a method performed by the IGO server as shown in FIGS. 5 and 6 to track gaming and non-gaming transactions using C3.

FIG. 14 is flow diagram of one embodiment of a method, performed by IGO server 514, to identify potential fraudulent or criminal activities involving gaming transactions occurring at different gaming operator platforms. The method is described in terms of wagers placed on a particular sporting event, in this example, a professional football game between the Seahawks and the Raiders, placed on platforms owned or operated by different gaming operator systems. It is assumed that a person has already opened a primary account with IGO server 514, the primary account comprising at least two sub-accounts, each sub-account associated with a particular gaming operator system and a respective C3. It is also assumed that the person has funded both accounts with C3 from each of the respective gaming operator systems. It should be understood that the steps described in this method could be performed in an order other than what is shown and discussed, and that some minor steps may have been omitted.

At block 1400, IGO server receives gaming transaction information from network interface 604 and provides the gaming transaction information to processor 600.

At block 1402, IGO server determines that the gaming transaction information comprises one or more of a wager provided by a certain gaming platform associated with a particular gaming operator system, in this case, an online wager placed through online gaming server 522 and associated with gaming operator system 502, a wager amount of C3 currency associated with gaming operator system 502, a wager event ID (i.e., Seahawks vs. Raiders), a wager selection (i.e., the Seahawks will win), a user account or sub-account associated with a person that submitted the wager, as explained above with respect to the method of FIG. 13.

At block 1404, processor debits a sub-account of the person, generates one or more crypto-blocks memorializing the transaction, and notifies casino gaming server 510 and/or online gaming server 522 to reduce a balance of the person by the amount of the wager, also as explained above with respect to the method of FIG. 13. Processor 600 may also store certain information in the gaming transaction information temporarily in memory 602 for use in determining illicit gaming transactions, as explained below. For example, processor 600 may store a user ID, wager information (amount, event ID, wager selection, date, time, platform, gaming system operator, etc.). This information may be only kept for a predetermined time, such as a time when a sporting event concludes, or at some point soon thereafter, such as a day or a week.

At block 1406, IGO server receives second gaming transaction information from network interface 604 and provides the gaming transaction information to processor 600.

At block 1408, IGO server determines that the second gaming transaction information comprises one or more of a wager provided by a certain gaming platform associated with a particular gaming operator system, in this case, a wager placed using sports wagering server 532 at gaming operator system 526, a wager amount of C3 currency associated with gaming operator system 526, a wager event ID (i.e., Seahawks vs. Raiders), a wager selection (i.e., the Raiders will win), a user account or sub-account associated with a person that submitted the wager, as explained above with respect to the method of FIG. 13.

At block 1410, processor 600 compares at least some of the information in the second gaming transaction information to the temporary gaming transaction information stored in memory 602. The comparison may be configured to determine that the same person placed a wager on the same sporting event, for example, based on the same user ID in each gaming transaction information received, but on opposing sides of the bet (i.e., bet on Seahawks to win and also bet on the Raiders to win). This may indicate money laundering. If processor 600 determines that such a condition exists, a decision to flag the transactions as suspicious may be filtered first through a predetermined threshold, to determine of the wager amounts are greater than a predetermined amount, such as $100.

At block 1412, when processor 600 determines that the same person placed wagers on both sides of an event, processor 600 generates a message that indicates the possibility of an illicit wager. The message may include a name of the person associated with the transactions, the person's account or sub-account information, the amount of the wagers, an identification of the platform where each wager was placed, the date and time that the wagers were placed, and the name of the gaming operator through which the wagers were placed.

At block 1414, the message is provided to one or both gaming operator systems, and/or to regulators via text message, email, voice call, or some other electronic notification system that provides timely alerts to such entities.

In this way, IGO server 514 is able to detect illicit wagering activities that may involve money laundering or match fixing, because IGO server 514 receives wagering information from multiple gaming operators and is, therefore, able to cross-check the wagering information originating from different gaming operators. In this way, illicit wagering detection techniques are improved by the use of IGO server 114.

While the foregoing disclosure shows illustrative embodiments of the invention, it should be noted that various changes and modifications could be made herein without departing from the scope of the invention as defined by the appended claims. The functions, blocks and/or actions of the method claims in accordance with the embodiments of the invention described herein need not be performed in any particular order. Furthermore, although elements of the invention may be described or claimed in the singular, the plural is contemplated unless limitation to the singular is explicitly stated. It should be noted that throughout this document, the terms "player", "user" and "patron" and the terms "virtual", "digital" and "electronic" are used interchangeably and the word "game" is used to describe a game of chance, a game of skill or wagering on an event such as a sport or a race.

I claim:

1. A method, performed by an inter-gaming operator computer server, for managing gaming and non-gaming transactions for a plurality of gaming operator systems, comprising:
   creating, by a processor of the inter-gaming operator computer server, a first account associated with a first user in response to a request from the first user, the first account for use with a first digital currency issued by a first gaming operator system;
   receiving, by the processor via a network interface coupled to the processor, first transaction information from a first gaming operator system, the first transaction comprising a wager comprising a first amount of the first digital currency;
   determining, by the processor, that the first transaction is associated with the first user from the first transaction information;
   determining, by the processor, that the first transaction originated from a first gaming platform associated with the first gaming operator system;
   reducing, by the processor, a balance of the first account by the first amount when the first transaction originated from a first gaming platform associated with the first gaming operator system; and
   encrypting, by the processor, at least some of the transaction information to form a crypto-block accessible by the first person.

2. The method of claim 1, further comprising:
   receiving, by the processor via the network interface, second transaction information comprising a second amount of the first digital currency;
   determining, by the processor, that the second transaction information comprises information about a non-gaming transaction;
   determining, by the processor, that the second transaction originated from a first merchant associated with the first gaming operator system;
   determining, by the processor, that the second transaction is associated with the first user;
   reducing, by the processor, the first account balance associated with the first user by the second amount when the second transaction information originated from a first merchant associated with the first gaming operator system.

3. The method of claim 1, further comprising:
   receiving, by the processor via the network interface, second transaction information comprising a second amount of a second digital currency;
   determining, by the processor, that the second transaction information originated from a second gaming operator system;
   determining, by the processor, that the second transaction is associated with the first user;
   determining, by the processor, that the first transaction information and the second transaction information is each associated with a first wagering event;
   determining, by the processor, that the first transaction information comprises an indication of a first wager placed by the first user on a first side of the wagering event;
   determining, by the processor, that the second transaction information comprises an indication of a second wager placed by the first user on an opposing side of the wagering event; and
   generating, by the processor, an alert when the first transaction information comprises the first wager placed by the first user on the first side of the wagering event, and that the second transaction information comprises the second wager placed by the first user on the opposing side of the wagering event.

4. The method of claim 1, wherein encrypting at least some of the transaction information to form a crypto-block comprises:
   assigning, by the processor, a first cryptographic key to the first user in response to the first user creating the first account; and
   encrypting, by the processor, at least some of the first transaction information using a second cryptographic key associated with the first cryptographic key.

5. The method of claim 4, further comprising:
   creating, by the processor, a third cryptographic key;
   providing, by the processor via the network interface, the third cryptographic key to the first gaming operator system; and
   generating, by the processor, a second crypto-block using a fourth cryptographic key associated with the third cryptographic key, the second crypto-block decryptable by the third cryptographical key.

6. The method of claim 2, wherein the first transaction information comprises information pertaining to a first wager placed on a first gaming platform associated with the first gaming operator system, and the second transaction information comprises information pertaining to a non-gaming transaction, the method further comprising:
   assigning, by the processor, a first cryptographic key to the first user;
   encrypting, by the processor, a first portion of the first transaction information using a second cryptographic key associated with the first cryptographic key; and
   encrypting, by the processor, the second transaction information using a second cryptographic key associated with the first cryptographic key.

7. The method of claim 1, wherein the first transaction information comprises information pertaining to a gaming transaction, wherein the crypto-block comprises a user ID and a game ID, and wherein the game ID identifies a particular gaming device of the first gaming platform.

8. The method of claim 1, further comprising:
   creating, by the processor, a second account associated with the first user in response to a request from the first user, the second account for use with a second digital currency issued by a second gaming operator system;

receiving, by the processor, a request from the user to transfer an amount of the first digital currency from the first account to a second amount of the second digital currency into the second account;

determining, by the processor, that the first account contains more than the amount requested;

converting, by the processor, the amount of the first digital currency into a second amount of the second digital currency;

debiting, by the processor, the first account by the first amount; and crediting, by the processor, the second account by the second amount.

9. The method of claim 8, further comprising:

notifying, by the processor via the network interface, the first gaming system operator that the first account was debited by the amount of the first digital currency; and notifying, by the processor via the network interface, the second gaming system operator that the second account was credited with the second amount of the second digital currency.

10. An inter-gaming operator server for managing gaming and non-gaming transactions for a plurality of gaming operator systems, comprising:

a network interface for sending and receiving digital data over a wide-area network;

a non-transitory memory for storing processor-executable instructions and a plurality of user accounts; and a processor coupled to the network interface and the non-transitory memory for executing the processor-executable instructions that cause the server to:

create, by the processor, a first account associated with a first user in response to a request from the first user received by the processor over the network interface, the first account for use with a first digital currency issued by a first gaming operator system;

receive, by the processor via the network interface, first transaction information from a first gaming operator system, the first transaction comprising a wager comprising a first amount of the first digital currency;

determine, by the processor, that the first transaction is associated with the first user from the first transaction information;

determine, by the processor, that the first transaction originated from a first gaming platform associated with the first gaming operator system;

reduce, by the processor, a balance of the first account by the first amount when the first transaction originated from a first gaming platform associated with the first gaming operator system; and encrypt, by the processor, at least some of the transaction information to form a crypto-block accessible by the first person.

11. The server of claim 10, wherein the processor-executable instructions comprise further instructions that cause the server to:

receive, by the processor via the network interface, second transaction information comprising a second amount of the first digital currency;

determine, by the processor, that the second transaction information comprises information about a non-gaming transaction;

determine, by the processor, that the second transaction originated from a first merchant associated with the first gaming operator system;

determine, by the processor, that the second transaction is associated with the first user;

reduce, by the processor, the first account balance associated with the first user by the second amount when the second transaction information originated from a first merchant associated with the first gaming operator system.

12. The server of claim 10, wherein the processor-executable instructions comprise further instructions that cause the server to:

receive, by the processor via the network interface, second transaction information comprising a second amount of a second digital currency;

determine, by the processor, that the second transaction information originated from a second gaming operator system;

determine, by the processor, that the second transaction is associated with the first user;

determine, by the processor, that the first transaction information and the second transaction information is each associated with a first wagering event;

determine, by the processor, that the first transaction information comprises an indication of a first wager placed by the first user on a first side of the wagering event;

determine, by the processor, that the second transaction information comprises an indication of a second wager placed by the first user on an opposing side of the wagering event; and generate, by the processor, an alert when the first transaction information comprises the first wager placed by the first user on the first side of the wagering event, and that the second transaction information comprises the second wager placed by the first user on the opposing side of the wagering event.

13. The server of claim 10, wherein the processor-executable instructions that cause the server to encrypt at least some of the transaction information to form a crypto-block comprises instructions that causes the server to:

assign, by the processor, a first cryptographic key to the first user in response to the first user creating the first account; and encrypt, by the processor, at least some of the first transaction information using a second cryptographic key associated with the first cryptographic key.

14. The server of claim 13, wherein the processor-executable instructions comprise further instructions that cause the server to:

create, by the processor, a third cryptographic key;

provide, by the processor, the third cryptographic key to the first gaming operator system; and generate, by the processor, a second crypto-block using a fourth cryptographic key associated with the third cryptographic key, the second crypto-block decryptable by the third cryptographical key.

15. The server of claim 11, wherein the first transaction information comprises information pertaining to a first wager placed on a first gaming platform associated with the first gaming operator system, and the second transaction information comprises information pertaining to a non-gaming transaction, wherein the processor-executable instructions comprise further instructions that cause the server to:

assign, by the processor, a first cryptographic key to the first user;

encrypt, by the processor, a first portion of the first transaction information using a second cryptographic key associated with the first cryptographic key; and encrypt, by the processor, the second transaction information using a second cryptographic key associated with the first cryptographic key.

16. The server of claim 10, wherein the first transaction information comprises information pertaining to a gaming transaction, wherein the crypto-block comprises a user ID and a game ID, and wherein the game ID identifies a particular gaming device of the first gaming platform.

17. The server of claim 10, wherein the processor-executable instructions comprise further instructions that cause the server to:
   create, by the processor, a second account associated with the first user in response to a request from the first user, the second account for use with a second digital currency issued by a second gaming operator system;
   receive, by the processor via the network interface, a request from the user to transfer an amount of the first digital currency from the first account to a second amount of the second digital currency into the second account;
   determine, by the processor, that the first account contains more than the amount requested;
   convert, by the processor, the amount of the first digital currency into a second amount of the second digital currency;
   debit, by the processor, the first account by the first amount; and
   credit, by the processor, the second account by the second amount.

18. The server of claim 8, wherein the processor-executable instructions comprise further instructions that cause the server to:
   notify, by the processor via the network interface, the first gaming system operator that the first account was debited by the amount of the first digital currency; and
   notify, by the processor via the network interface, the second gaming system operator that the second account was credited with the second amount of the second digital currency.

* * * * *